United States Patent
Han

(10) Patent No.: US 10,627,926 B2
(45) Date of Patent: Apr. 21, 2020

(54) USER INTERFACING METHOD AND ELECTRONIC DEVICE FOR PERFORMING THE SAME

(71) Applicant: Samsung Electronics Co., Ltd., Gyeonggi-do (KR)

(72) Inventor: Sang Jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/423,309

(22) Filed: Feb. 2, 2017

(65) Prior Publication Data

US 2017/0220137 A1 Aug. 3, 2017

(30) Foreign Application Priority Data

Feb. 2, 2016 (KR) .................... 10-2016-0012788

(51) Int. Cl.
| | | |
|---|---|---|
| *G06F 3/033* | (2013.01) | |
| *G06F 3/0362* | (2013.01) | |
| *G06F 1/16* | (2006.01) | |
| *G04G 21/00* | (2010.01) | |
| *G06F 3/01* | (2006.01) | |
| *G06F 3/0484* | (2013.01) | |
| *G06F 3/16* | (2006.01) | |

(52) U.S. Cl.
CPC .......... *G06F 3/0362* (2013.01); *G04G 21/00* (2013.01); *G06F 1/163* (2013.01); *G06F 3/016* (2013.01); *G06F 3/04845* (2013.01); *G06F 3/04847* (2013.01); *G06F 3/162* (2013.01); *G06F 3/165* (2013.01); *G06F 2203/04806* (2013.01)

(58) Field of Classification Search
USPC ..................... 345/156, 173, 174, 175, 184
See application file for complete search history.

(56) References Cited

U.S. PATENT DOCUMENTS

| | | |
|---|---|---|
| 6,556,222 B1 | 4/2003 | Narayanaswami |
| 7,312,785 B2 | 12/2007 | Tsuk et al. |
| 7,710,393 B2 | 5/2010 | Tsuk et al. |
| 8,952,886 B2 | 2/2015 | Tsuk et al. |
| 9,009,626 B2 | 4/2015 | Tsuk et al. |

(Continued)

FOREIGN PATENT DOCUMENTS

| | | |
|---|---|---|
| EP | 2733597 A2 | 5/2014 |
| EP | 2863276 A2 | 4/2015 |

(Continued)

OTHER PUBLICATIONS

Foreign Communication from Related Counterpart Application; European Patent Application No. 17153455.5; Extended European Search Report and European Search Opinion dated Jun. 8, 2017; 10 pages.

(Continued)

*Primary Examiner* — Thuy N Pardo

(57) ABSTRACT

Disclosed is an electronic device including a rotation member that rotates in a first direction or a second direction, a memory configured to store a specific rotation pattern, and a controller configured to, if a rotation pattern of the rotation member between the first direction and the second direction matches with the specific rotation pattern, perform a functional operation corresponding to the specific rotation pattern.

20 Claims, 18 Drawing Sheets

(56) References Cited

U.S. PATENT DOCUMENTS

| | | |
|---|---|---|
| 2003/0076301 A1 | 4/2003 | Tsuk et al. |
| 2003/0103032 A1 | 6/2003 | Wong et al. |
| 2006/0092177 A1 | 5/2006 | Blasko |
| 2007/0080936 A1 | 4/2007 | Tsuk et al. |
| 2008/0094352 A1 | 4/2008 | Tsuk et al. |
| 2008/0098330 A1 | 4/2008 | Tsuk et al. |
| 2010/0053464 A1* | 3/2010 | Otsuka ............... G08C 17/02 348/734 |
| 2010/0265172 A1* | 10/2010 | Sadahiro ............. G06F 3/0338 345/157 |
| 2012/0242626 A1* | 9/2012 | Hu ..................... G06F 3/04897 345/184 |
| 2014/0035810 A1* | 2/2014 | Shen ................... G06F 3/147 345/156 |
| 2014/0160078 A1* | 6/2014 | Seo ..................... G06F 3/017 345/175 |
| 2015/0049037 A1 | 2/2015 | Vincent et al. |
| 2015/0111558 A1 | 4/2015 | Yang |
| 2015/0160622 A1 | 6/2015 | Kim et al. |
| 2015/0248175 A1 | 9/2015 | Tsuk et al. |
| 2015/0309536 A1* | 10/2015 | Dickinson ........... G06F 3/0412 345/173 |
| 2016/0085286 A1* | 3/2016 | Zhou ................... G06F 1/1637 345/156 |
| 2016/0378189 A1* | 12/2016 | Moussette .............. G06F 3/041 345/173 |

FOREIGN PATENT DOCUMENTS

| | | |
|---|---|---|
| KR | 20140064690 A | 5/2014 |
| KR | 20140081554 A | 7/2014 |
| WO | 2015170253 A1 | 11/2015 |
| WO | 2016008346 A1 | 1/2016 |

OTHER PUBLICATIONS

Foreign Communication from Related Counterpart Application; PCT Patent Application No. PCT/KR2017/000996; International Search Report and Written Opinion of the International Searching Authority dated May 19, 2017; 13 pages.

Office Action dated May 2, 2018 in connection with European Patent Application No. 17 153 455.5.

* cited by examiner

USER INTERFACING METHOD AND ELECTRONIC DEVICE FOR PERFORMING THE SAME

CROSS-REFERENCE TO RELATED APPLICATION AND CLAIM OF PRIORITY

The present application is related to and claims the benefit under 35 U.S.C. § 119(a) of a Korean patent application filed on Feb. 2, 2016 in the Korean Intellectual Property Office and assigned Serial number 10-2016-0012788, the entire disclosure of which is hereby incorporated by reference.

TECHNICAL FIELD

The present disclosure relates to a user interfacing method by which an electronic device may perform a specific functional operation based on a value obtained from an input device, and a device for performing the same.

BACKGROUND

In recent years, electronic devices have been implemented in the form of a smartphone carried by the users or wearable devices attached to parts of the bodies of the users. A smart watch that is an example of the wearable devices, for example, may be mounted on a wrist of the user to function as a traditional watch and may provide various functions, such as detection of a biometric signal, measurement of an amount of exercises, connection to a network, to the user as well.

The wearable device may include a user input unit for receiving an input from a user. For example, the user input unit may be implemented by a touch panel included in a display. However, in order to ensure portability, the display of the electronic device has a limited size. Accordingly, the input to the display having a limited size generates an unintended input or provides an input environment that is inconvenient to the user.

SUMMARY

To address the above-discussed deficiencies, it is a primary object to provide an electronic device including a rotation member configured to rotate in a first direction or a second direction, a memory configured to store a specific rotation pattern, and a controller configured to, if a rotation pattern of the rotation member between the first direction and the second direction matches with the specific rotation pattern, perform a functional operation corresponding to the specific rotation pattern.

In accordance with another aspect of the present disclosure, there is provided a user interfacing method of an electronic device including a rotation member, the user interfacing method including receiving at least one rotation of the rotation member in a first direction and at least one rotation of the rotation member in a second direction from the rotation member, and if a rotation pattern of the rotation member matches with a specific rotation pattern, performing a functional operation corresponding to the specific rotation pattern.

In accordance with another aspect of the present disclosure, there is provided a computer-readable recording medium in which instructions being executable by at least one processor of an electronic device and being readable by a computer are stored, wherein the instructions are configured to cause the at least one processor to receive at least one rotation in a first direction and at least one rotation in a second direction from a rotation member, and if a rotation pattern of the rotation member matches with a specific rotation pattern, perform a functional operation corresponding to the specific rotation pattern.

In accordance with another aspect of the present disclosure, there is provided an electronic device including a housing, a circular display exposed to one surface of the housing, a wheel structure arranged on the one surface of the housing and being rotatable in a first direction and a second direction opposite to the first direction while surrounding the circular display, a sensor configured to detect rotation of the wheel structure, a processor arranged within the housing and electrically connected to the display and the sensor, and a memory electrically connected to the processor, and the memory may store instructions, when executed, cause the processor to display a first screen on the display, monitor rotation of the wheel structure by using the sensor, determine whether the wheel structure alternately rotates in the first direction and the second direction for a specific time period, at least partially based on the monitored rotation of the wheel structure, and modify at least a portion of the first screen to display the modified portion of the first screen on the display or perform a specific function of the electronic device, at least partially based on a determination of whether the wheel structure alternatively rotates.

Other aspects, advantages, and salient features of the disclosure will become apparent to those skilled in the art from the following detailed description, which, taken in conjunction with the annexed drawings, discloses various embodiments of the present disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, it should be noted that like reference numbers are used to depict the same or similar elements, features, and structures.

DETAILED DESCRIPTION

Figure 1:
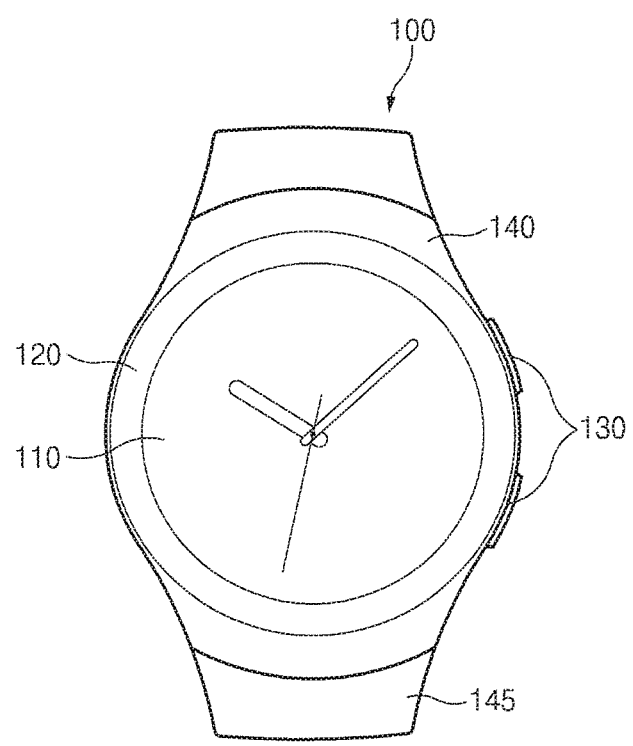
FIG. 1 illustrates an electronic device according to various embodiments of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged services and electronical devices.

Hereinafter, various embodiments of the present disclosure will be described with reference to the accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the disclosure disclosed herein, the expressions "have," "may have," "include" and "comprise," or "may include" and "may comprise" used herein indicate existence of corresponding features (e.g., elements such as numeric values, functions, operations, or components) but do not exclude presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein may refer to various elements of various embodiments of the present disclosure, but do not limit the elements. For example, such terms are used only to distinguish an element from another element and do not limit the order and/or priority of the elements. For example, a first user device and a second user device may represent different user devices irrespective of sequence or importance. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), it can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used as, for example, the expression "suitable for," "having the capacity to," "designed to," "adapted to," "made to," or "capable of." The term "configured to" must not mean only "specifically designed to" in hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) that may perform corresponding operations by executing one or more software programs which are stored in a memory device.

Terms used in this specification are used to describe specified embodiments of the present disclosure and are not intended to limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), MP3 players, mobile medical devices, cameras, and wearable devices. According to various embodiments of the present disclosure, the wearable devices may include accessories (e.g., watches, rings, bracelets, ankle bracelets, glasses, contact lenses, or head-mounted devices (HMDs)), cloth-integrated types (e.g., electronic clothes), body-attached types (e.g., skin pads or tattoos), or implantable types (e.g., implantable circuits).

In some embodiments of the present disclosure, the electronic device may be one of home appliances. The home appliances may include, for example, at least one of a television (e.g. a smart TV), a digital video disk (DVD) player, an audio, a refrigerator, an air conditioner, a cleaner, an oven, a microwave oven, a washing machine, an air cleaner, a set-top box, a home automation control panel, a security control panel, a TV box (e.g., SAMSUNG HOMESYNC™, APPLE TV™, or GOOGLE TV™), a game console (e.g., XBOX™ or PLAYSTATION™), an electronic dictionary, an electronic key, a camcorder, or an electronic panel.

In another embodiment of the present disclosure, the electronic device may include at least one of various medical devices (e.g., various portable medical measurement devices (a blood glucose meter, a heart rate measuring device, a blood pressure measuring device, and a body temperature measuring device), a magnetic resonance angiography (MRA), a magnetic resonance imaging (MRI) device, a computed tomography (CT) device, a photographing device, and an ultrasonic device), a navigation system, a global navigation satellite system (GNSS), an event data recorder (EDR), a flight data recorder (FDR), a vehicular infotainment device, electronic devices for vessels (e.g., a navigation device for vessels and a gyro compass), avionics, a security device, a vehicular head unit, an industrial or home robot, an automatic teller's machine (ATM) of a financial company, a point of sales (POS) of a store, or an internet of things (e.g., a bulb, various sensors, an electricity or gas meter, a spring cooler device, a fire alarm device, a thermostat, an electric pole, a toaster, a sporting apparatus, a hot water tank, a heater, and a boiler).

According to some embodiments of the present disclosure, the electronic device may include at least one of furniture or a part of a building/structure, an electronic board, an electronic signature receiving device, a projector, or various measurement devices (e.g., a water service, electricity, gas, or electric wave measuring device). In various embodiments of the present disclosure, the electronic device may be one or a combination of the aforementioned devices. The electronic device according to some embodiments of the present disclosure may be a flexible electronic device. Further, the electronic device according to an embodiment of the present disclosure is not limited to the aforementioned devices, but may include new electronic devices produced due to the development of technologies.

Hereinafter, electronic devices according to an embodiment of the present disclosure will be described with reference to the accompanying drawings. Although a smart watch will be described as the electronic device in the specification, it may be for convenience. The present disclosure does not exclude the case in which various embodiments of the present disclosure are applied to the above-described devices. The term "user" used herein may refer to a person who uses an electronic device or may refer to a device (e.g., an artificial electronic device) that uses an electronic device.

FIG. 1 illustrates an electronic device according to various embodiments of the present disclosure.

Referring to FIG. 1, the electronic device 100 according to an embodiment, for example, may correspond to a smart watch. The electronic device 100 may include a display 110, a rotation member 120, one or more physical buttons 130, a housing 140, and a band 145.

The display 110, for example, may include a liquid crystal display (LCD), a light emitting diode (LED) display, an organic light emitting diode (OLED) display, a microelectromechanical system (MEMS) display, or an electronic paper display. The display 110, for example, may be exposed to one surface of the housing 140 of the electronic device 100 to display various contents (e.g., an image of a watch) to a user. The display 110, for example, may have various shapes, such as a circular shape or a polygonal shape (e.g., a rectangular shape) and may include a touch screen that may receive a touch input from the user.

The rotation member 120 may correspond to an example of a user interface through which the user may interact with the electronic device 100. The rotation member 120, for example, may be referred by various terms, such as a wheel structure, a rotary wheel, or a rotational bezel. The rotation member 120, for example, may be arranged on one surface of the housing 140 that constitutes the electronic device 100. The rotation member 120, for example, may have a ring shape that surrounds a periphery of the (circular) display 110.

The rotation member 120, for example, may rotate in a first direction (e.g., clockwise (CW)) or in a second direction (e.g., counterclockwise (CCW)) that is opposite to the first direction.

The one or more physical buttons 130 may correspond to an example of a user interface through which the user may interact with the electronic device 100. For example, the one or more physical buttons 130 may include a home button for outputting a home screen and a back button for returning the screen to a previous screen.

The housing 140 (or a case) may be formed of plastic, glass, a metal, or a combination thereof to protect various elements within the electronic device 100 from an external impact or dust.

The band 145 may correspond to a configuration for mounting the electronic device 100 on a part (e.g., a wrist) of the body of the user. For example, the band 145 may be formed of an elastomer, leather of an animal (e.g., a cow or an alligator), a metal (e.g., a stainless steel, gold, or platinum) or fabric (e.g., nylon or KEVLAR™).

Figure 2:
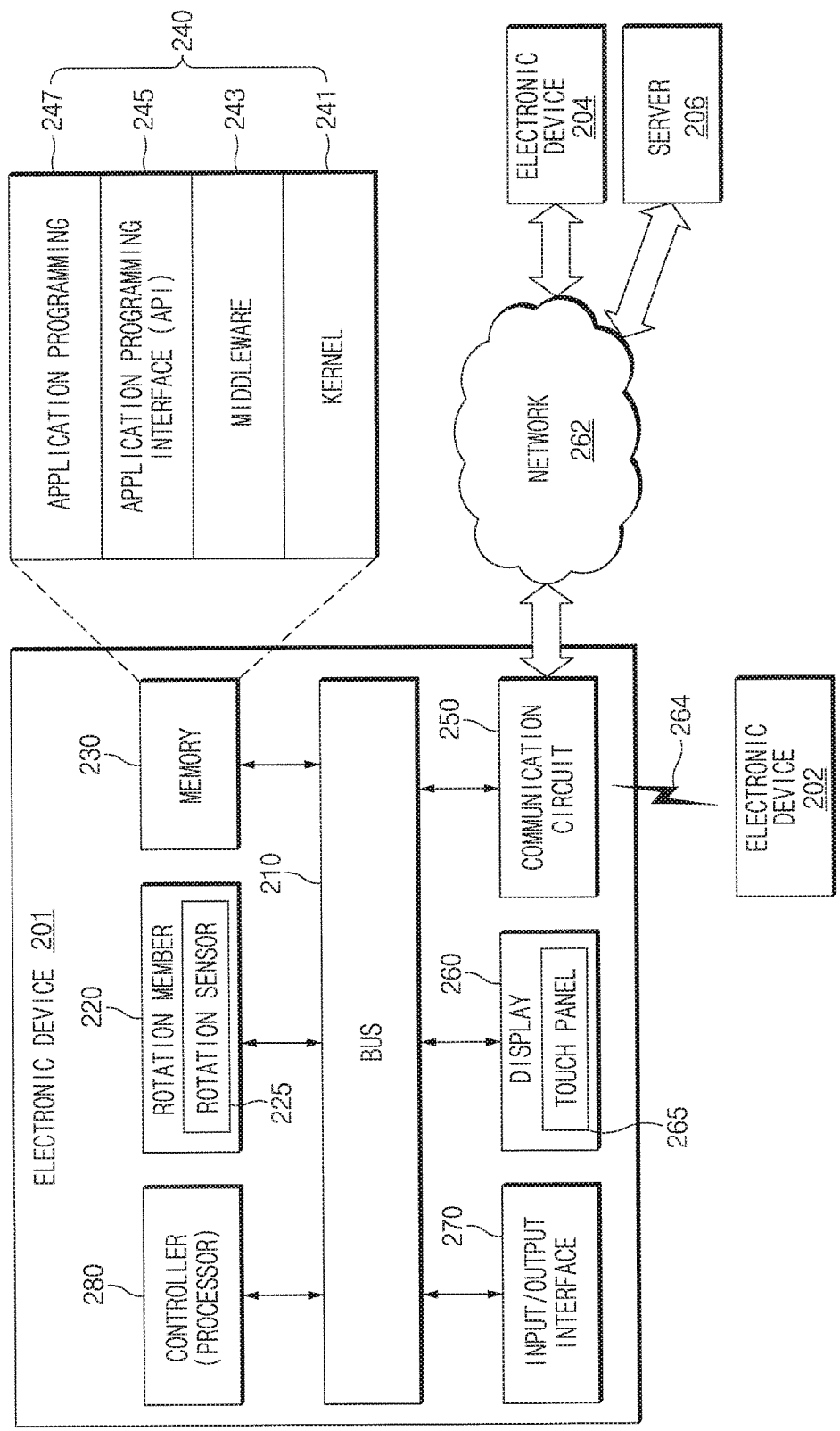
FIG. 2 illustrates an electronic device according to various embodiments of the present disclosure.

FIG. 2 illustrates an electronic device according to an embodiment of the present disclosure.

Referring to FIG. 2, the electronic device 201 according to an embodiment of the present disclosure, for example, may correspond to the electronic device 100 of FIG. 1. In various embodiments, the electronic devices 201, 202, and 204 and the server 206 may be connected to each other through a network 262 or a short range communication 264.

According to an embodiment, the electronic device 201 may include a bus 210, a rotation member 220, a memory 230, a communication circuit 250, a display 260, an input/output interface 270, and a controller (or a processor) 280. In some embodiments, the electronic device 201 may exclude at least one of the elements or may additionally include another element.

The bus 210 may include, for example, a circuit that connects the components 220 to 280 and transfers communications (e.g., control messages and/or data) between the components.

The rotation member 220 (e.g., corresponding to the rotation member 120 of FIG. 1) may correspond to an example of a user interface, through which the user may interact with the electronic device 201. The rotation member 220, for example, may have a ring shape that surrounds a periphery of the electronic device 201, and may rotate in a first direction (e.g., clockwise (CW)) or in a second direction (e.g., counterclockwise direction (CCW)) about a center of a surface of the electronic device 201.

According to an embodiment, the rotation member 220 may include a rotation sensor 225 (also referred to as "a sensor"). The rotation sensor 225 may monitor rotation of the rotation member 220. For example, the rotation sensor 225 may detect and monitor a rotational direction and/or a rotation angle of the rotation member 220. According to various embodiments, the rotation sensor 225 may detect a rotation distance, by which the rotation member 220 rotates, by multiplying the rotation angle and a radius of the (circular) display 260 together.

For example, the rotation sensor 225 is a sensor for detecting a mechanical motion, and may include an optical sensor or a magnetic sensor to detect an angle by which the rotation member 220 rotates. The rotation sensor 225, for example, may convert the detected angle into an electrical signal and provide the electrical signal to the controller 280 through the bus 210.

According to an embodiment, the rotation member 220 may provide a discrete haptic reaction to the user for each specific rotation angle as the rotation member 220 rotates. For example, the rotation member 220 may include a plurality of physical bosses (protrusions or bumps) for each specific angle on an inside (e.g., that is close to the display 260) of the rotation member 220 to provide the haptic reaction to the user. The physical bosses, for example, may interact with detents that are provided in the housing of the electronic device 201. The detents, for example, may be arranged at portions of the housing of the electronic device 201, which are coupled to the rotation member 220.

For example, if the rotation member 220 rotates, the bosses may contact the detents at each specific angle. A click feeling and a click sound that is generated then may be provided to the user as a haptic response and an auditory response when the rotation member 220 rotates. Because the bosses may be arranged at a specific angular interval along an inside rim of the rotation member 220, the click feeling and the click sound may become integer times as large as the original click feeling and click sound if the rotation member 220 rotates by integer times as large as the specific angular interval. The clock feeling and the click sound that are integer times may allow the user to ascertain the number of detents.

As another example, the rotation member 220 may include a haptic response support structure that is implemented magnetically instead of including physical bosses.

Further, according to various embodiments, the bosses may not be arranged inside the rotation member 220, but may be arranged at a periphery (a part at which the housing of the electronic device 201 is coupled to the rotation member 220) of the housing of the electronic device 201. In this case, the detents may be arranged inside the rotation member 220.

The memory 230 may include volatile and/or nonvolatile memories. The memory 230, for example, may be electrically connected to the controller 280 and other elements to store instructions or data related to at least one element of the electronic device 201.

According to an embodiment, the memory 230 may store various data, and/or software. For example, the memory 230 may store various instructions that includes operations performed by the controller 280 (or a processor) when being executed. The operations performed by the controller 280 (or a processor) in response to the instructions will be described later.

According to another embodiment, the memory 230 may store a rotation pattern (or a direction switching pattern) that is related to physical rotation of the rotation member 220. For example, the rotation pattern may be defined in advance by the user, and may be stored in the memory 230 in correspondence to a specific functional operation of the electronic device 201. The correspondence of the rotation pattern and the functional operation may be constructed in a database.

The rotation pattern, for example, may be set based on a number of switching of rotational directions of the rotation member between the first direction and the second direction for a specific time period (e.g., 2 seconds). That is, the rotation pattern may include the number of switching of directions between the first direction and the second direction as at least one parameter. According to various embodiments, the rotation pattern may include a rotational direction, a rotational angle (or the number of detents), and/or a time interval for detecting the rotation pattern as another parameter.

According to an embodiment, in the rotation pattern, a case in which the directions are switched once for a specific time interval and a case in which the directions are switched two times (or more) may be regarded as separate rotation patterns. The specific time interval may be variously set, for example, to 200 ms, 400 ms, 1000 ms, and 2000 ms.

Further, according to an embodiment, the rotation pattern may consider a sequence of switching of directions. For example, a case in which the direction is switched from a first direction (e.g., clockwise (CW)) to a second direction (e.g., counterclockwise (CCW)) and a case in which the direction is switched from the second direction to the first direction may be recognized as different direction switching operations.

Further, according to an embodiment, the rotation patterns may be regarded as separate rotation patterns based on a time gap between the rotation patterns. The time gap may be variously set, for example, to 100 ms, 200 ms, and 500 ms.

Further, according to an embodiment, the time intervals for detecting the rotation patterns may be combined. For example, the first time interval may be divided into time interval 1A and time interval 1B having different lengths, and rotation pattern A in time interval 1A and rotation pattern B in time interval 1B may be variously combined. For example, the electronic device 201 may perform a specific functional operation only after detecting rotation pattern A in time interval 1A, and rotation pattern B in time interval 1B (see FIG. 4B).

The functional operation corresponding to the rotation pattern may be differently set based on an application that may be executed by the electronic device 201. For example, the application that may be executed by the electronic device 201 may include various applications, such as a multimedia play application (e.g., a music play application), a music editing application (e.g., SOUNDCAMP®), a message application (e.g., an SMS/MMS application or an instant message (IM) application), a voice recognition application (e.g., S-VOICE™), and an image viewer application (e.g., a gallery application).

According to various embodiments, the memory 230 may store a program 240. The program 240 that may be stored in the memory 230, for example, may include a kernel 241, middleware 243, an application programming interface (API) 245, and/or an application program (or an application) 247. At least some of the kernel 241, the middleware 243, or the API 245 may be referred to as an operating system (OS).

The kernel 241, for example, may control or manage system resources (e.g., the bus 210, the processor 280, and the memory 230) that are used to execute operations or functions implemented in the other programs (e.g., the middleware 243, the API 245, or the applications 247). The kernel 241 may provide an interface through which the middleware 243, the API 245, or the application program 247 access individual components of the electronic device 201 to control or manage the system resources.

The middleware 243, for example, may function as an intermediary that allows the API 245 or the applications 247 to communicate with the kernel 241 to exchange data.

The middleware 243 may process one or more work requests received from the application programs 247, according to their priorities. For example, the middleware 243 may give a priority, by which a system resource (e.g., the bus 210, the processor 280, or the memory 230) of the electronic device 201 may be used, to at least one of the application programs 247. For example, the middleware 243 may perform scheduling or load balancing for the one or more work requests by processing the one or more work requests according to the priority given to the at least one of the application programs 247.

The API 245, for example, is an interface used, by the application program 247, to control a function provided by the kernel 241 or the middleware 243, and may include, for example, at least one interface or function (e.g., an instruction), for example, for file control, window control, image processing, and text control.

The communication circuit 250, for example, may set a communication between the electronic device 201 and an external device (e.g., a first external electronic device 202, a second external electronic device 204, or a server 206) by using a designated protocol. For example, the communication circuit 250 may be connected to a network 262 through a wireless communication or a wired communication to communicate with the external device (e.g., the second external electronic device 204 or the server 206).

The wireless communication is, for example, a cellular communication protocol, and, for example, may use at least one of long-term evolution (LTE), LTE-advanced (LTE-A), code division multiple access (CDMA), wideband CDMA (WCDMA), a universal mobile telecommunications system (UMTS), wireless broadband (WiBro), or a global system for mobile communications (GSM). Furthermore, the wireless communication, for example, may include a short range communication 264. The short range communication 264, for example, may include at least one of wireless fidelity (Wi-Fi), BLUETOOTH, near field communication (NFC), magnetic stripe transmission (MST), or GNSS.

An MST may generate a pulse according to transmission data by using an electromagnetic signal, and the pulse may generate a magnetic field signal. The electronic device 201 may transmit the magnetic field signal to a point of sales (POS), detect the magnetic field signal by using an MST reader, and restore the data by converting the detected magnetic signal into an electrical signal.

The GNSS may include at least one of, for example, a global positioning system (GPS), a global navigation satellite system (GLONASS), a BEIDOU navigation satellite system (hereinafter, "Beidou"), or the European global satellite-based navigation system (or GALILEO), according to an in-use area or a bandwidth. Hereinafter, in the present disclosure, the "GPS" may be interchangeably used with the "GNSS." The wired communication may include at least one of, for example, a universal serial bus (USB), a high definition multimedia interface (HDMI), recommended standard-232 (RS-232), and a plain old telephone Service (POTS). The network 262 may include at least one of communication networks, for example, a computer network (e.g., a LAN or a WAN), the Internet, or a telephone network.

The display 260 (e.g., corresponding to the display 110 of FIG. 1A) may include a liquid crystal display (LCD), a light emitting diode (LED) display, an organic light emitting diode (OLED) display, a micro electromechanical system (MEMS) display, and an electronic paper display.

As described above, the display 260 may have various shapes such as a circular shape or a polygonal shape (e.g., a rectangular shape), and may output or display various contents (e.g., a text, an image, a video, an icon, a widget, a thumbnail or a symbol) to the user. The display 260 may include a touch panel 265 and receive, for example, a touch, a gesture, a proximity, or a hovering input using an electronic pen or the user's body through the touch panel 265.

The input/output interface 270, for example, may function as an interface that may transfer a command or data that are input from the user or another external device to another element (other elements) of the electronic device 201. Further, the input/output interface 270 may output a command or data received from another component (other elements) of the electronic device 201 to the user or anther external device.

According to an embodiment, the input/output interface 270 may include a sound interface. For example, the sound interface may be connected to a sound output device (e.g., a speaker, an earphone, or a headphone). The controller 280 (or a processor), for example, may generates a sound signal based on playback of a sound source, and may provide the generated sound signal to the sound output device through the sound interface. The controller 280 (or referred to as a processor) may include one or more of a central processing unit (CPU), an application processor (AP), a communication processor (CP), or an application controller unit (ACU). For example, the controller 280 may be arranged within the housing (e.g., the housing 140 of FIG. 1), and may be electrically connected to the display 260 and the rotation sensor 225. The controller 280 may perform control of one or more other elements 210 to 270 and/or calculation or data processing on communication between the other elements 210 to 270.

According to an embodiment, if a rotation pattern of the rotation member 220 between the first direction and the second direction matches with a specific rotation pattern stored in the memory 230 (e.g., coincides with the specific rotation pattern within a specific probability range), the controller 280 may perform a functional operation corresponding to the specific pattern. According to various embodiments, the controller 280 may perform a functional operation corresponding to a rotation of the rotation member 220 in the first direction or a functional operation corresponding to a rotation of the rotation member 220 in the second direction at the same time when a functional operation corresponding to the specific rotation pattern is performed.

The functional operation that may be performed by the controller 280 may be very various based on applications that may be executed by the electronic device 201. Examples of the various functional operations are illustrated in FIGS. 6 to 15. Meanwhile, the functional operations that may be performed by the controller 280 are not limited to the examples.

For example, the controller 280 (or a processor) may display a first screen on the display 260. The controller 280 may monitor (or detect) rotation of the rotation member 220 by using the rotation sensor 225. For example, the controller 280 may monitor a rotational direction and/or a rotation distance of the rotation member 220 by using the rotation sensor 225. The controller 280 (or a processor) may determine whether the rotation member 220 alternately rotates in the first direction and/or the second direction for a specific time period, at least partially based on the monitored rotation of the rotation member 220. The controller 280 (or a processor) may modify at least a portion of the first screen to display of the modified portion of the first screen on the display 260 or perform a specific function of the electronic device 201, at least partially based on the determination.

For example, the controller 280 may perform a first rotation in the first direction by at least a first rotation distance for a specific time period, and may determine whether a second rotation is performed in the second direction by at least a second rotation distance immediately after the first rotation. Further, for example, the controller 280 may perform a third rotation in the first direction by at least a third rotation distance for a specific time period immediately after the second rotation, and may determine whether a fourth rotation is performed in the second direction by at least a fourth rotation distance immediately after the third rotation. According to various embodiments, the third rotation distance may correspond to (or be substantially the same as) the first rotation distance, and the fourth rotation distance may correspond to (or be substantially the same as) the second rotation distance.

According to another embodiment, the controller 280 (a processor) may determine that one of the first to fourth rotations or a combination of two or more thereof is performed to perform at least one corresponding function of the plurality of functions of the electronic device 100.

According to various embodiments, the controller 280 (or a processor) may modify a sound signal provided to the sound interface, at least partially based on the determination.

The first and second external electronic devices 202 and 204 may be the same or different type devices from the electronic device 201. According to an embodiment, the server 206 may include a group of one or more servers. According to various embodiments of the present disclosure, all or some of the operations executed by the electronic device 201 may be executed by another or a plurality of electronic devices (e.g., the electronic devices 202 and 104 or the servers 206). According to an embodiment of the present disclosure, when the electronic device 201 should execute some functions or services automatically or upon request, it may request at least some functions associated with the functions or services from another device (e.g., the electronic devices 202 and 204 or the server 206), in place of or in addition to directly executing the functions or services. The other electronic device (e.g., the electronic device 202 or 204 or the server 206) may execute a requested function or an additional function, and may transfer the result to the electronic device 201. The electronic device 201 may process the received result directly or additionally, and may provide a requested function or service. To this end, for example, the cloud computing, distributed computing, or client-server computing technologies may be used.

Figure 3:
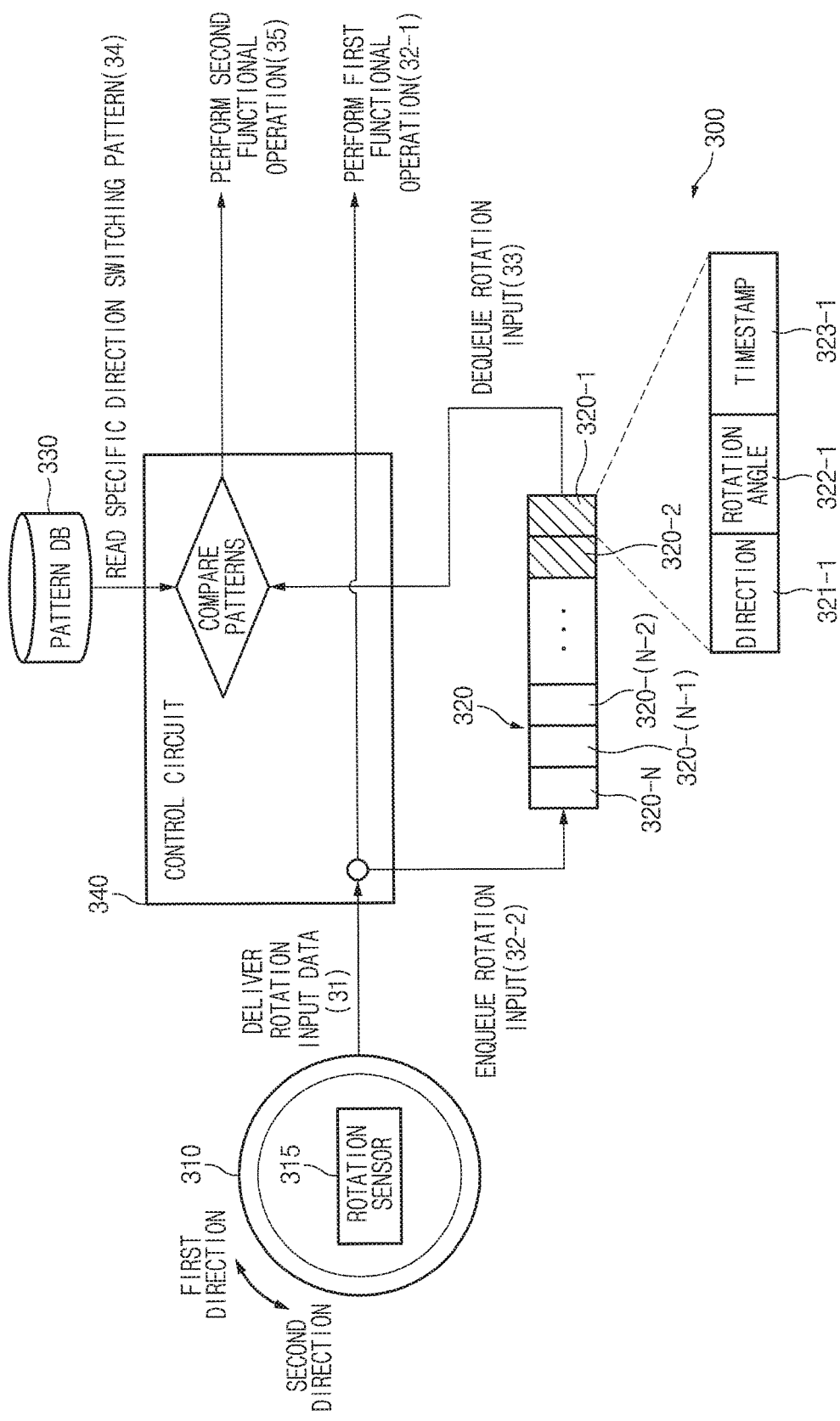
FIG. 3 illustrates an electronic device according to various embodiments of the present disclosure.

FIG. 3 illustrates an electronic device according to another embodiment of the present disclosure.

Referring to FIG. 3, the electronic device 300 according to an embodiment may include a rotation member 310, a queue 320, a pattern database 330, and a controller 340. For example, the rotation member 310 may correspond to the rotation member 220 of FIG. 2, and the controller 340 may correspond to the controller 280. Further, the queue 320 and the pattern database 330 may be implemented by at least a portion of the memory 230 of FIG. 2. Hereinafter, a description of the configurations corresponding to those of FIG. 2 will be omitted.

The rotation member 310, for example, may rotate in the first direction (e.g., clockwise (CW)) or in the second direction (e.g., counterclockwise (CCW)) through manipulation of the user. The rotation of the rotation member 310 may be detected by the rotation sensor 315 based on a specific unit time period, and may be converted into an electrical signal. Rotation input data as the result of conversion may be delivered to the controller 340 (operation 31). For example, the rotation input data may have a form of {rotational direction}{rotation angle}{timestamp}, {rotational direction}{rotation distance}{timestamp}, or {direction} {number of detects}{timestamp}. For example, when the detents are provided in the rotation member 310 at an angular interval of 6°, the rotation angle of 60° may correspond to the number of detents of 10.

If receiving rotation input data from the rotation sensor 315 (operation 31), the controller 340, for example, may perform a first functional operation corresponding to the rotation input data itself (operation 32-1). Further, the controller 340, for example, may enqueue (or store) the rotation input data to the queue 320 (operation 32-2). As the rotation input data is branched in the controller 340 and operation 32-1 and operation 32-2 are performed based on the branched rotation input data, the first functional operation corresponding to the rotation input data itself and the enqueuing operation may be independently performed.

The queue 320 (or a memory to or from which data is written or read according to the queue), for example, may include N queue spaces 320-1, 320-2, 320-3, . . . , and 320-N. For example, one piece of rotation input data may be stored in the first queue space 320-1. For example, a rotational direction 321-1, a rotation angle 322-1, and a timestamp 323-1 may be stored in the first queue space 320-1. According to various embodiments, the rotation angle may be replaced by a rotation distance or the number of detents to be stored.

Although the queue 320 is used as an example of a memory in a detailed description of FIG. 3, the present disclosure is not limited thereto. The queue 320 may be implemented by various types of memories that may receive data, store the received data for a specific time period, and output the stored data. For example, the queue 320 may be understood as a buffer or a buffer memory.

Figure 4A:
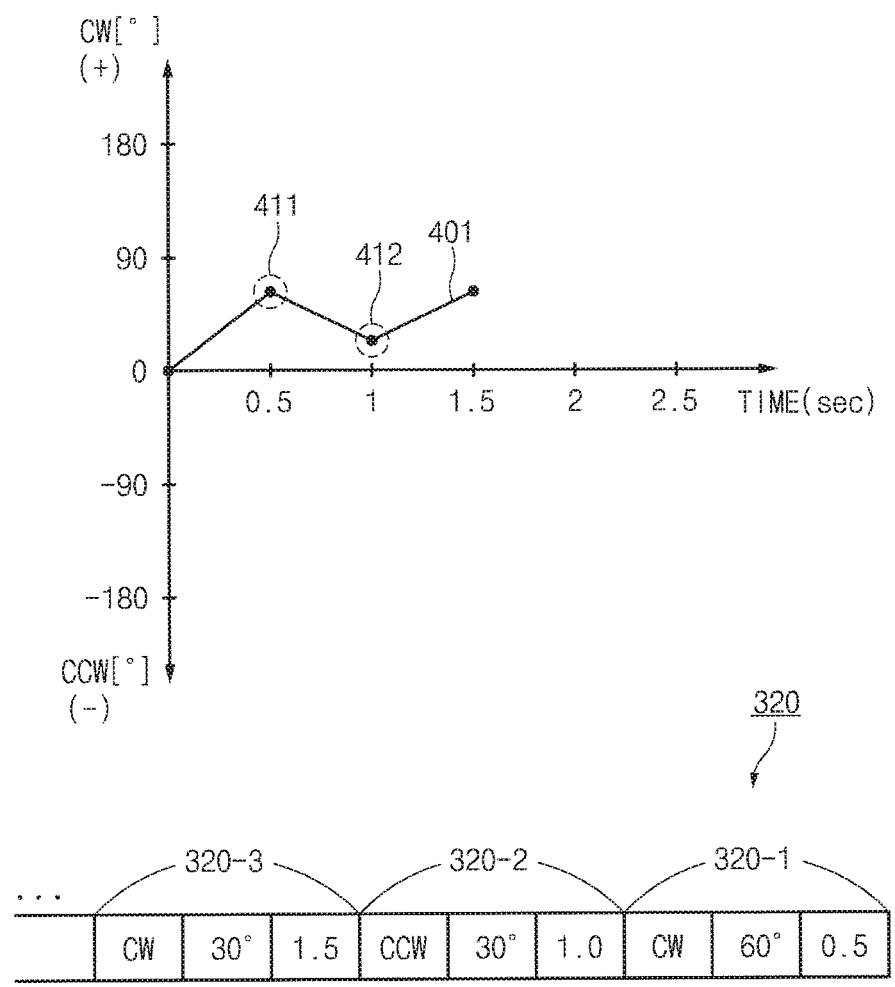
FIGS. 4A and 4B are views for explaining rotation input data according to various embodiments of the present disclosure.

FIG. 4A is a view illustrating the rotation input data according to an embodiment.

FIG. 4A illustrates a view for explaining generation of rotation input data and a storage form (a data structure). For example, if a rotation member 310 of FIG. 3 rotates in a first direction or in a second direction, the rotation sensor 315 may generate rotation input data as the rotation member 310 rotates. The generated rotation input data may be stored in a queue 320. For convenience of description, the reference numerals of FIG. 3 will be used in a detailed description of FIG. 4A.

Referring to graph 401, the rotation member 310 of FIG. 3, for example, may rotate in a first direction (e.g., clockwise (CW)) by 60°, rotate in a second direction (e.g., counter-clockwise (CCW)) by 30°, and rotate in the first direction (clockwise (CW)) by 30°, for 1.5 seconds. That is, the rotation member 310 may switch the rotational direction thereof a total of two times at time points of 0.5 seconds 411 and 1.0 seconds 412, for 1.5 seconds.

The rotation of the rotation member 310 may be detected by the rotation sensor 315. For example, the rotation sensor 315 may convert the rotation of the rotation member 310 into rotation input data at a specific unit time interval (e.g., 0.5 seconds). The converted rotation input data, for example, may be enqueued to a queue 320 via the controller 340 (see operations 31 and 32-2 of FIG. 3).

For example, referring to the queue 320 of FIG. 4A, when the specific unit time interval is 0.5 seconds, the rotation sensor 315 may generate three pieces of rotation input data in the sequence of [{direction}{rotation angle}{timestamp}], for example, as in [{CW}{60°}{0.5}, {CCW}{30°}{1.0}], and [{CW}{30°}{1.5}]. The three pieces of rotation input data may be sequentially enqueued (or stored) in the queue spaces 320-1, 320-2, and 320-3 of the queue 320.

Referring back to FIG. 3, the controller 340, for example, may dequeue the rotation input data from the queue 320 at a specific unit time interval (e.g., 0.5 seconds) (operation 33 of FIG. 3). The controller 340 may dequeue the rotation input data from the queue 320 at a specific unit time interval based on first input first output, FIFO (operation 33).

The controller 340 may detect a rotation pattern of the rotation member 310, based on at least one piece of rotation input data that is dequeued for a specific time interval (e.g., 1 second, 1.5 seconds, and 2 seconds). For example, the controller 340 may detect a rotation pattern of the rotation member 310 from a trend of rotation input data that is dequeued for the specific time interval. According to various embodiments, the specific time interval may be variously set based on setting of the user.

The controller 340 reads a specific rotation pattern from the pattern database 330 (operation 34), and may compare the read rotation pattern with the detected rotation pattern. If the detected rotation pattern matches with the specific rotation pattern, the controller 340 may perform a second functional operation corresponding to the specific rotation pattern (operation 35).

The second functional operation of the controller 340 may be differently set based on the applications that are being executed by the electronic device. For example, the second functional operation may correspond to an enlargement or reduction of an output magnification of an image viewer application, or may correspond to playback or stop of a multimedia play application. The second functional operation is not limited to the example, but may include various functional operations described in the specification.

According to various embodiments, the specific time interval for detecting a rotation pattern of the rotation member 310 may be adjusted according to machine learning of the electronic device 300. For example, if the rotation member 310 rotates so slowly that several effective rotation patterns are detected several time even immediately after the specific time interval (e.g., 1.5 seconds), the specific time interval may be automatically extended to 1.6 seconds or 1.7 seconds.

Further, according to various embodiments, the specific time interval may be divided into a plurality of time intervals, and the second functional operation may be set based on a combination of rotation patterns in the plurality of divided time intervals.

Figure 4B:
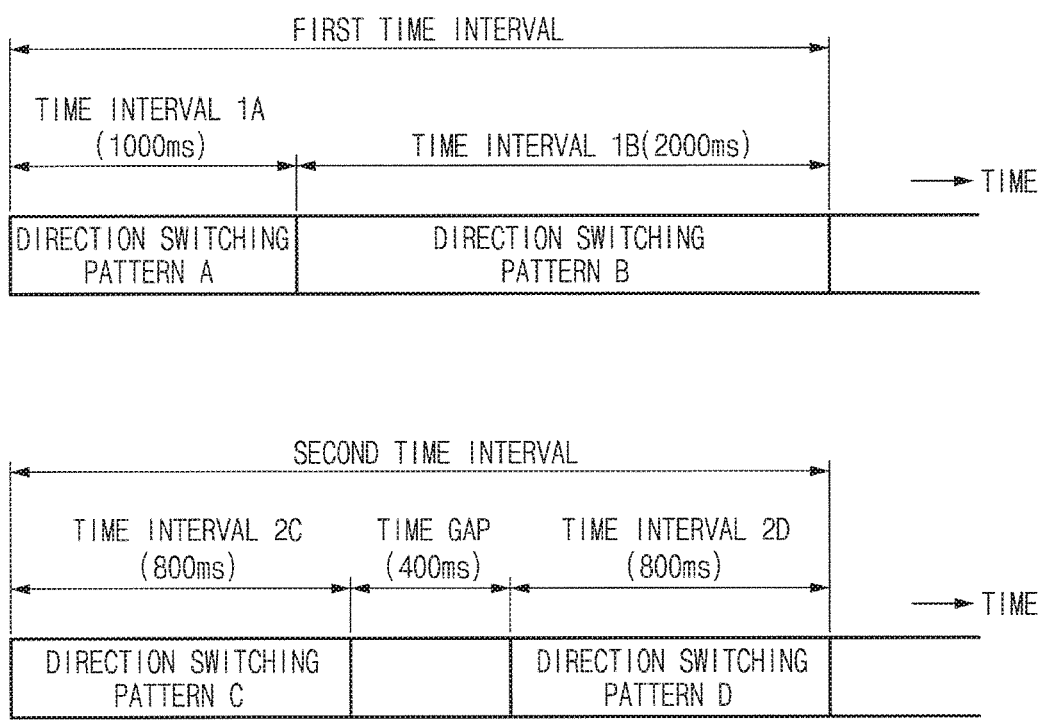

For example, referring to FIG. 4B, the pattern database 330 is configured to perform the second functional operation only when rotation pattern A is detected for time interval 1A (e.g., 1000 ms) and then rotation pattern B is detected for time interval 1B (e.g., 2000 ms).

For example, rotation pattern A may correspond to a unidirectional rotation with no switching of rotational directions, and rotation pattern B may correspond to switching of rotational directions of two times. For example, when an image viewer application is executed, images that are output on the whole screen of the display may be sequentially switched as rotation pattern A is detected. Subsequently, if rotation pattern B is detected, a screen of a list of images including thumbnails of the images may be output on the display (the second functional operation is performed). If rotation pattern A is not detected but rotation pattern B is directly detected, an enlarged image of the currently output image may be output on the display of the electronic device (the enlarged image corresponds to rotation pattern B and another operation that is different from the second functional operation is performed).

As another example, the pattern database 330 may be configured to perform the second functional operation only if, as a switching pattern, rotation pattern C is detected for time interval 2C (e.g., 800 ms), no pattern is detected for a specific time gap (e.g., 400 ms), and rotation pattern D is detected for time interval 2D (e.g., 800 ms).

For example, rotation pattern C may correspond to switching of rotational directions of two times, and rotation pattern D may correspond to switching of rotational directions of three times. For example, rotation pattern C is detected for time interval 2C (e.g., 800 ms), the controller 340 may execute a camera application. Thereafter, if no pattern is detected for a specific time interval (e.g., 400 ms) and rotation pattern D is detected for time interval 2D (e.g., 800 ms), the mode of the electronic device may be switched to a camera mode (e.g., a panorama mode). According to various embodiments, a time gap between time interval 2C and time interval 2D may be set to different lengths such as 600 ms and 800 ms. The electronic device may perform different functions based on the length of the time gap.

Figure 5:
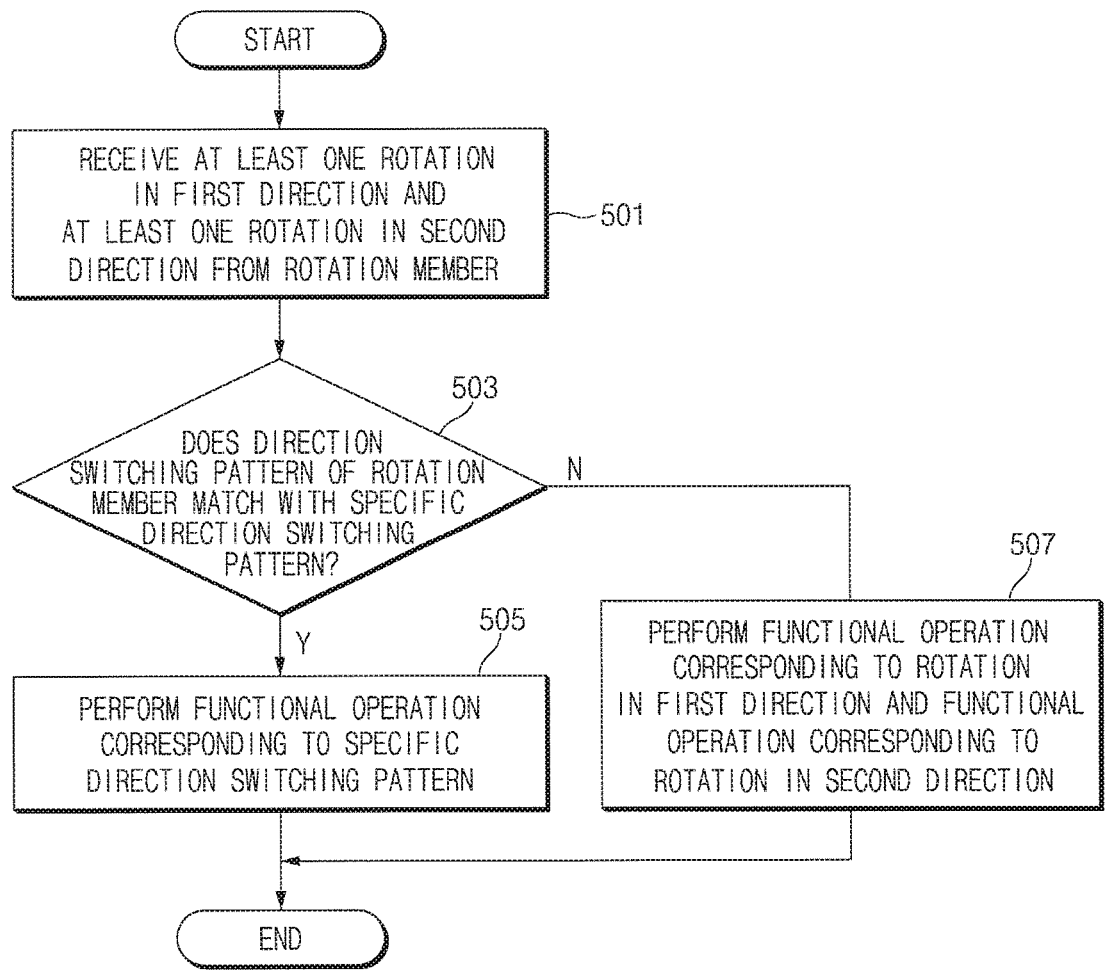
FIG. 5 illustrates a user interfacing method according to various embodiments of the present disclosure.

FIG. 5 illustrates a user interfacing method according to an embodiment of the present disclosure.

Referring to FIG. 5, the user interfacing method is a method for allowing a user to interact an electronic device, and may mean a method for ascertaining manipulation by the user and ascertaining the manipulation as a user input. The user interfacing method according to an embodiment may include operations 501 to 507. Operations 501 to 507, for example, may be performed by the electronic device 201 of FIG. 2. For example, operations 501 to 507 may be implemented by instructions that may be performed (or executed) by the controller 280 of the electronic device 201. The instructions, for example, may be stored in the memory 230 of the electronic device 201. Hereinafter, the reference numerals of FIG. 2 are used in a description of operations 501 to 507.

In operation 501, the controller 280 of the electronic device 201 may receive at least one rotation of the rotation member 220 in a first direction and/or at least one rotation of the rotation member 220 in a second direction from the rotation member 220.

In operation 503, the controller 280 of the electronic device 201 may determine whether the rotation pattern of the rotation member 220 matches with a specific rotation pattern stored in the memory 230. The specific rotation pattern may be set based on a number of switching of directions between the first direction and the second direction for a specific time period (e.g., 2 seconds). If the controller 280 determines that the two patterns match with each other ('Y' in operation 503), the process may proceed to operation 505, and if the controller 280 determines that the two patterns do not match with each other, ('N' in operation 503), the process may proceed to operation 507.

In operation 505, if the controller 280 of the electronic device 201 determine the rotation pattern of the rotation member 220 matches with a specific rotation pattern stored in the memory 230, the electronic device 201 may perform a functional operation corresponding to the specific rotation pattern.

According to an embodiment, the functional operation corresponding to the specific rotation pattern may be set in the memory 230 in various forms, based on the applications that may be executed by the electronic device. The functional operation corresponding to the specific rotation pattern may at least include a functional operation related to playback of a multimedia content, a functional operation of modifying an output magnification of a content that is output on the display, and a functional operation of transmitting a specific message to an external device.

According to an embodiment, the controller 280 may further perform a functional operation corresponding to a rotation of the rotation member 220 in the first direction and/or a functional operation corresponding to a rotation of the rotation member 220 in the second direction at the same time when a functional operation corresponding to the specific rotation pattern is performed. For example, when a functional operation corresponding to the specific rotation pattern corresponds to an output magnification enlargement operation of a text and functional operations corresponding to a rotation of the rotation member 220 in the first direction and a rotation of the rotation member 220 in the second direction correspond to vertical scrolling operations for texts, the output magnification enlargement operation and the vertical scrolling operations for the text may be performed simultaneously.

In operation 507, as the controller 280 of the electronic device 201 determined that the rotation pattern of the rotation member 220 does not match with a specific rotation pattern stored in the memory 230, the electronic device 201 may perform a functional operation corresponding to the at least one rotation of the rotation member 220 in the first direction and/or a functional operation corresponding to the at least one rotation of the rotation member 220 in the second direction.

As described above, the electronic device may perform various functional operations based on the rotation pattern of the rotation member 220. That is, the electronic device according to various embodiments of the present disclosure may provide the rotation pattern between the first direction and the second direction to be a new user interface. Hereinafter, various embodiments of the present disclosure will be described with reference to FIGS. 6 to 15. However, the present disclosure is not limited to the following examples, and more various embodiments are possible.

Figure 6:
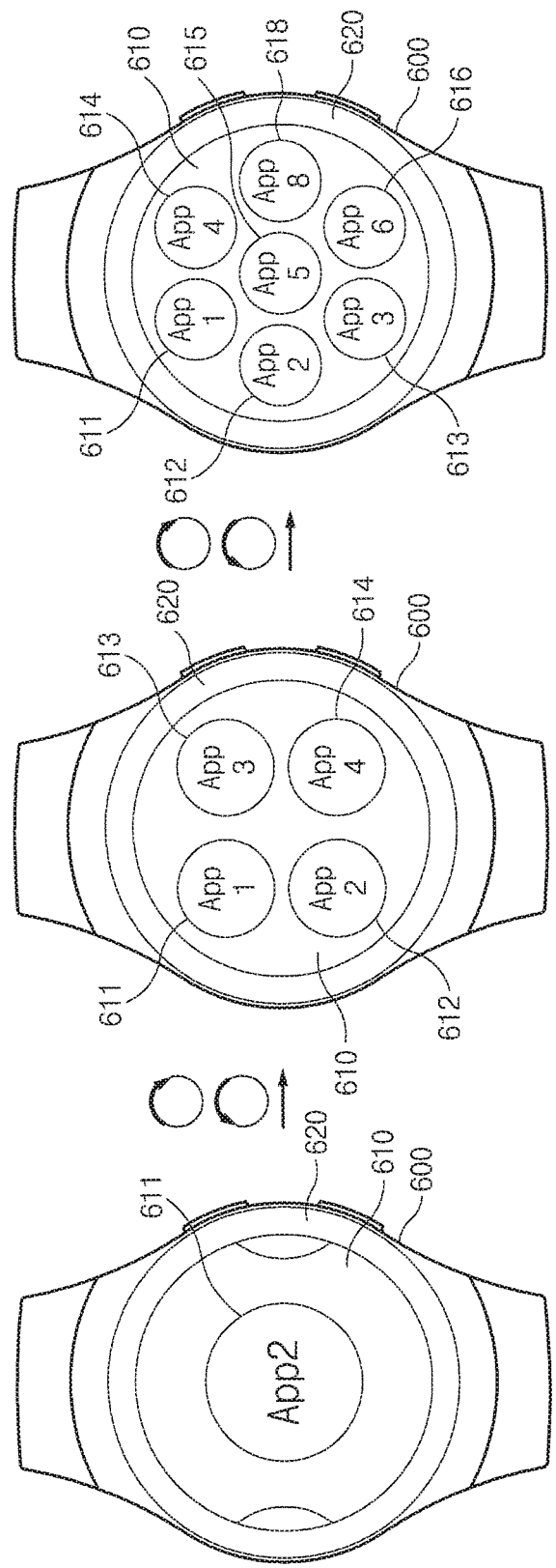
FIG. 6 illustrates a view for explaining that a display output magnification is modified through an operation of an electronic device according to various embodiments of the present disclosure.

FIG. 6 is a view for explaining that a display output magnification is modified through an operation of an electronic device according to an embodiment.

FIG. 6 illustrates an electronic device 600. For example, "switching of directions of one time for 1 second" may be designated in advance in a memory of the electronic device 600. Further, in the memory, "switching of directions of one time or more for 1 second" may correspond to a functional operation of modifying (e.g., enlarging or reducing) an output magnification of a content in a home screen.

For example, an icon 611 of a second application (App 2) may be output on a display 610 of the electronic device 600. A rotation member 620 of the electronic device 600 may rotate once clockwise (CW) and once counterclockwise (CCW) for 1 second. In this case, as it corresponds to "switching of directions of one time for 1 second", the output magnification of the icons may be reduced by one step. Accordingly, icons 611 to 614 of first to fourth applications (Apps 1 to 4) may be output on the display 610 of the electronic device 600.

According to an embodiment, in the electronic device that outputs the icons 611 to 614, the rotation member 620 may rotate once clockwise (CW) and once counterclockwise (CCW) for 1 second again. In this case, as it matches with "switching of directions of one time for 1 second", the output magnification of the icons may be further reduced by one step. Accordingly, icons 611 to 616 and 618 of first to sixth and eighth applications (Apps 1 to 6 and 8) may be output on the display 610 of the electronic device 600.

According to various embodiments, the electronic device 600 may provide different functions based on the number of switching of rotational directions of the rotation member 620. For example, "switching of directions of two times for 1 second" may be designated in advance in a memory of the electronic device 600. In this case, in the electronic device that outputs the icon 612 of the second application, for example, the rotation member 620 may rotate in a pattern of one clockwise (CW) rotation, one counterclockwise (CCW) rotation, and one clockwise (CW) rotation for 1 second. As the switching of rotational directions of the rotation member 620 matches with "switching of rotational directions of two times for 1 second", the output magnification of the icons may be reduced in two steps. Accordingly, icons 611 to 616 and 618 of first to sixth and eighth applications (Apps 1 to 6 and 8) may be directly output on the display 610 of the electronic device 600 (this is the same in the following description of FIGS. 7 and 8).

As another example, "switching of directions of three times for 1 second" or "switching of directions of four times for 1 second" may be designated in advance in the memory of the electronic device 600. For example, if the directions of the rotation member 620 are switched three or four times for 1 second, the electronic device 600 may enter a menu for setting an output magnification (or an output mode) of a home screen or may execute a function related to the home screen.

Further, according to various embodiments, the electronic device 600 may further perform a functional operation corresponding to the clockwise (CW) rotation and/or a functional operation corresponding to the counterclockwise (CCW) rotation, in addition to a functional operation of modifying the output magnification. For example, in the electronic device that outputs the icon 612 of the second application, if the rotation member 620 rotates clockwise (CW), the icon 613 of the third application may be scrolled and be output. As another example, in the electronic device that outputs the icon 612 of the second application, if the rotation member 620 rotates counterclockwise (CCW), the icon 611 of the first application may be scrolled and be output.

Further, although the output magnification of an application icon has been mainly described in relation to FIG. 6, the present disclosure is not limited thereto. According to various embodiments, various viewing schemes (e.g., the configurations (for example, a thumbnail or a text), a criteria for category of icons) related to icons may be modified based on the rotation pattern.

Figure 7:
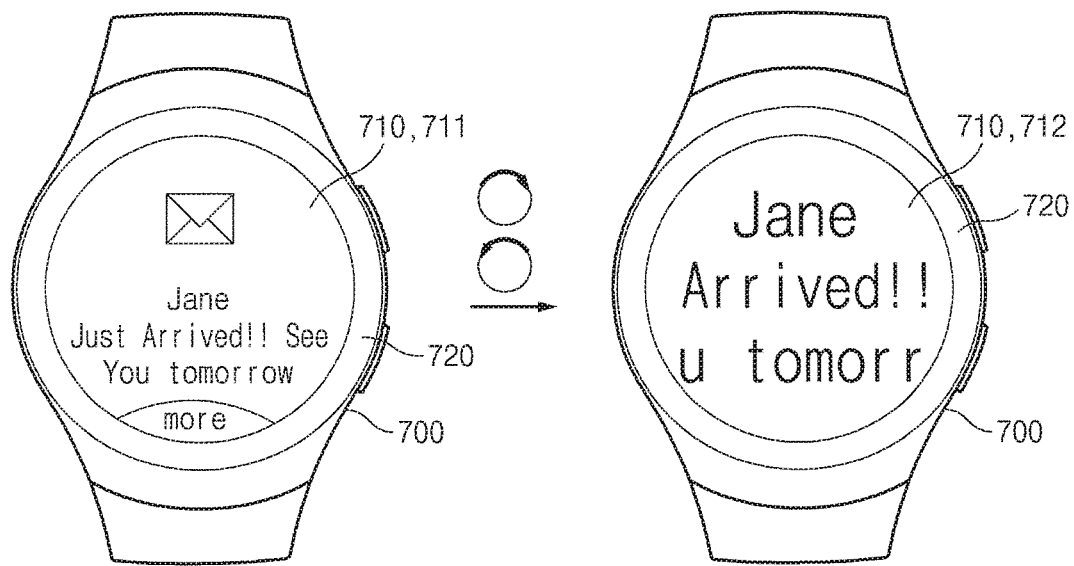
FIG. 7 illustrates a view for explaining that a display output magnification is modified through an operation of an electronic device according to various embodiments of the present disclosure.

FIG. 7 is a view for explaining that a display output magnification is modified through an operation of an electronic device according to another embodiment.

FIG. 7 illustrates an electronic device 700. For example, "switching of directions of one time for 1 second" may be designated in advance in a memory of the electronic device 700. Further, in the memory, "switching of directions of one time for 1 second" may correspond to a functional operation of modifying (e.g., enlarging or reducing) a scale factor (or magnifying power) of a content in an execution screen of a message application (e.g., an SMS/MMS application or an IM application).

For example, an execution screen 711 of a message application may be output on a display 710 of the electronic device 700. A rotation member 720 of the electronic device 700 may rotate once clockwise (CW) and once counterclockwise (CCW) for 1 second. In this case, as it corresponds to "switching of directions of one time for 1 second", the output magnification of the contents (e.g., a text of a received message) may be reduced by one step. Accordingly, the display 710 of the electronic device 700 may output a screen 712, in which a portion of the content is enlarged.

Further, according to various embodiments, the electronic device 700 may further perform a functional operation corresponding to the clockwise (CW) rotation and/or a functional operation corresponding to the counterclockwise (CCW) rotation, in addition to a functional operation of modifying the output magnification. For example, in the electronic device that outputs the screen 711, if the rotation member 720 rotates clockwise (CW) or counterclockwise (CCW), another content (e.g., another received message) may be scrolled and be output on the display 710.

Figure 8:
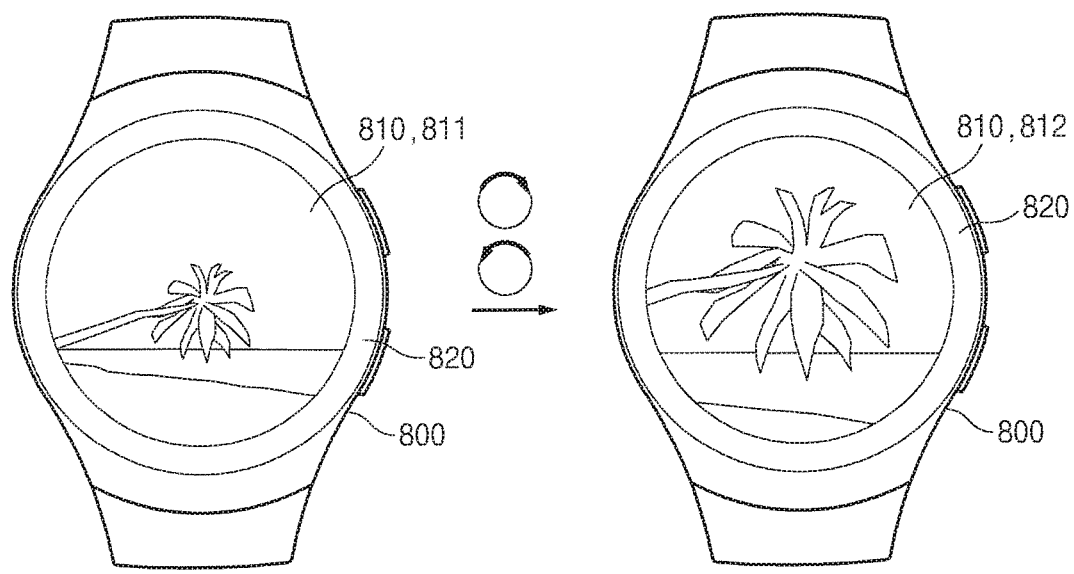
FIG. 8 illustrates a view for explaining that a display output magnification is modified through an operation of an electronic device according to various embodiments of the present disclosure.

FIG. 8 is a view for explaining that a display output magnification is modified through an operation of an electronic device according to another embodiment.

FIG. 8 illustrates an electronic device 800. For example, "switching of directions of one time for 1 second" may be designated in advance in a memory of the electronic device 800. Further, in the memory, "switching of directions of one time for 1 second" may correspond to a functional operation of modifying (e.g., enlarging or reducing) an output magnification of a content in an execution screen of an image viewer application (e.g., a gallery application).

For example, an execution screen 811 of an image viewer application may be output on a display 810 of the electronic device 800. A rotation member 820 of the electronic device 800 may rotate once clockwise (CW) and once counterclockwise (CCW) for 1 second. In this case, as it corresponds to "switching of directions of one time for 1 second", the output magnification of the contents (e.g., an output image) may be reduced by one step. Accordingly, the display 810 of the electronic device 800 may output a screen 812, in which a portion of the content is enlarged.

Further, according to various embodiments, the electronic device 800 may further perform a functional operation corresponding to the clockwise (CW) rotation and/or a functional operation corresponding to the counterclockwise (CCW) rotation, in addition to a functional operation of modifying the output magnification. For example, in the electronic device that outputs the screen 811, if the rotation member 820 rotates clockwise (CW) or counterclockwise (CCW), another content (e.g., another image) may be scrolled and be output on the display 810.

Figure 9:
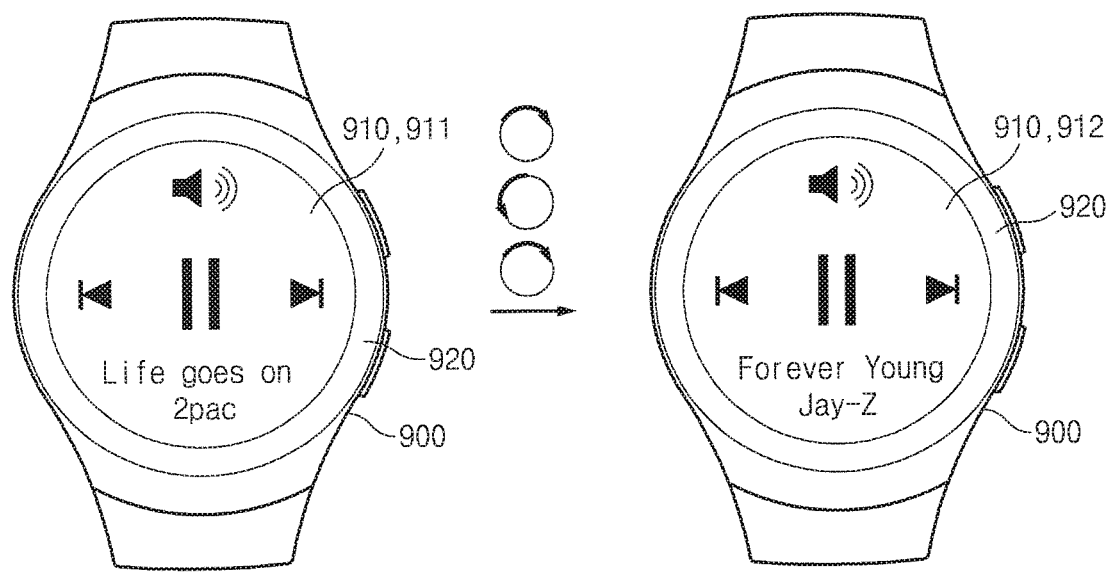
FIG. 9 illustrates a view for explaining that playback of a multimedia content is controlled through an operation of an electronic device according to various embodiments of the present disclosure.

FIG. 9 is a view for explaining that playback of a multimedia content is controlled through an operation of an electronic device according to another embodiment.

FIG. 9 illustrates an electronic device 900. For example, "one clockwise (CW) rotation, one counterclockwise (CCW) rotation, and one clockwise (CW) rotation, for 1 second (hereinafter, a first switching pattern)" and "one counterclockwise (CCW) rotation, one clockwise (CW) rotation, and one counterclockwise (CCW) rotation, for 1 second (hereinafter, a second switching pattern)" may be designated in advance. That is, the first switching pattern and the second switching pattern may be interpreted as separation rotation patterns as the sequences of the rotational directions are different even though switching of the rotational directions is made two times for the same time interval.

According to an embodiment, in the memory of the electronic device, the first switching pattern and the second switching pattern may correspond to a functional operation related to the playback of the multimedia content. For example, the first switching pattern may correspond to a functional operation of changing the played content to the next content, and the second switching pattern may correspond to a functional operation of changing the played content to the previous content.

For example, an execution screen 911 (e.g., including the name of the currently played music and the artist of the music) of a multimedia playback application may be output on a display 910 of the electronic device 900. A rotation member 920 of the electronic device 900 may rotate once clockwise (CW), once counterclockwise (CCW), and once clockwise (CW) for 1 second. As this matches with the first switching pattern, the electronic device 900 may stop the currently played content and may play back the next content. Accordingly, the display 910 of the electronic device 900 may output a screen 912, in which the music name and the artist name of the next content are included.

Further, according to various embodiments, the first switching pattern or the second switching pattern may correspond to at least one of playback/stop of a multimedia content, setting/release of a shuffle playback mode, or setting/release of a repeated playback mode, in addition to modification of the played content.

Figure 10:
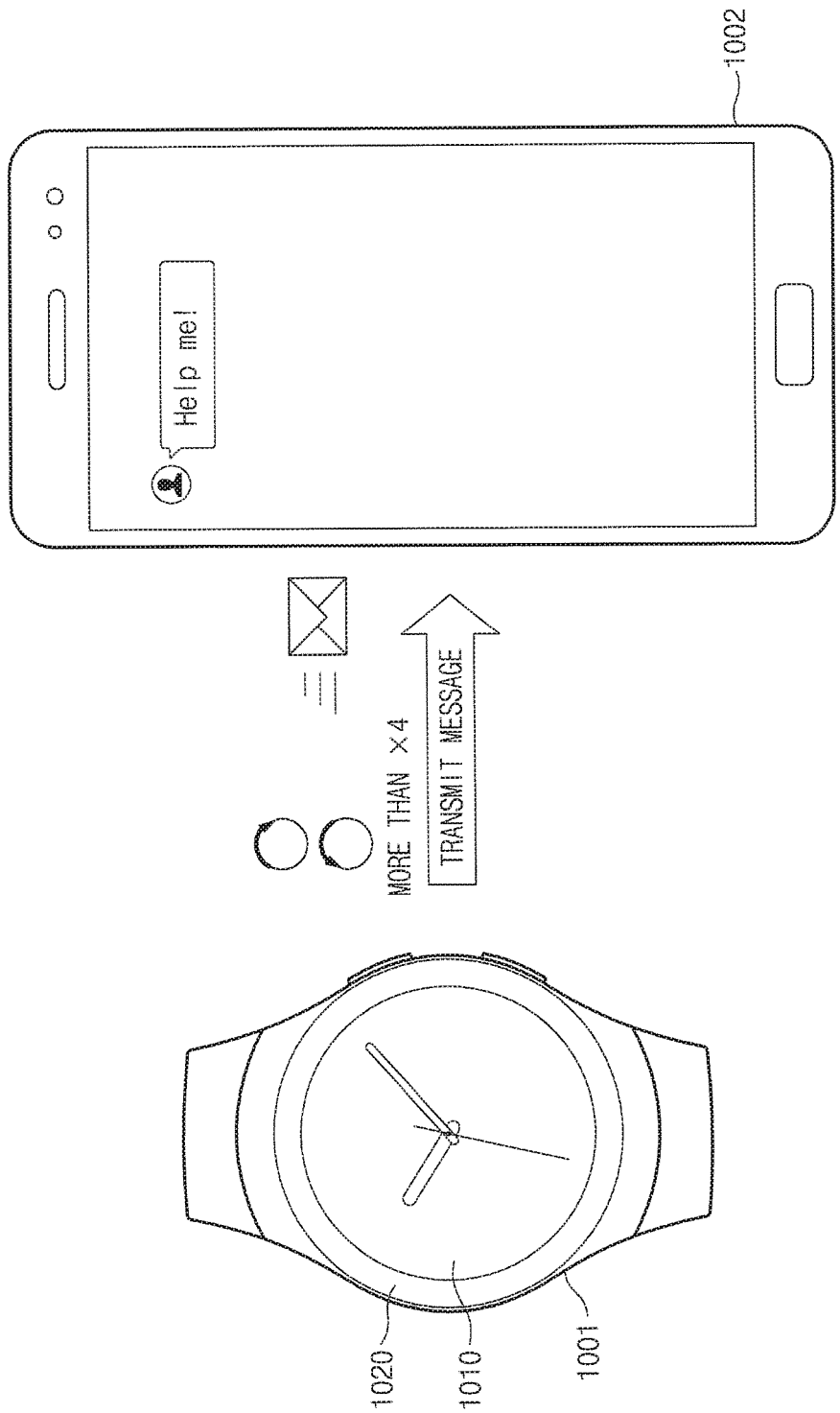
FIG. 10 illustrates a view for explaining that a message is transmitted to a specific reception site through an operation of an electronic device according to various embodiments of the present disclosure.

FIG. 10 is a view for explaining that a message is transmitted to a specific reception site through an operation of an electronic device according to another embodiment.

FIG. 10 illustrates an electronic device 1001 and an external device 1002. The external device 1002, for example, may correspond to a device (e.g., a smartphone) that includes at least some of the configurations of the electronic device 1001 or include a similar configuration. For example, the external device 1002 may correspond to the electronic device 202 of FIG. 2.

According to an embodiment, the owners of the electronic device 1001 and the external device 1002 may be different. Further, the electronic device 1001 and the external device 1002, for example, may communication with each other through a network (e.g., a cellular network).

According to an embodiment, "switching of directions of four times or more for two seconds (hereinafter, a third switching pattern)" may be designated in advance in the memory of the electronic device 1001. Further, in the memory the third switching pattern may correspond to a functional operation related to transmission of a message (e.g., an SMS/MMS or an IM). For example, a functional operation related to transmission of the message may correspond to an operation of transmitting a message including at least one of a specific text (e.g., "Help me!") or a specific image to the external device 1002.

For example, a screen including an image of a watch may be output on a display 1010 of the electronic device 1001. The rotation member 1020 of the electronic device 1001, for example, may alternately rotate clockwise (CW) three times and counterclockwise (CCW) two times, for 2 seconds, through manipulation of the user who requires an emergency rescue. As rotation of the rotation member 1020 matches with the third switching pattern, the electronic device 1001 may transmit a message including at least one of a specific text or a specific image to a specific external device 1002, where the specific external device 1002 may be designated in advance.

According to various embodiments, the electronic device 1001 may transmit a specific message to the specific external device 1002 via a device that is paired with the electronic device 1001 itself through short range communication (e.g., Bluetooth).

Figure 11:
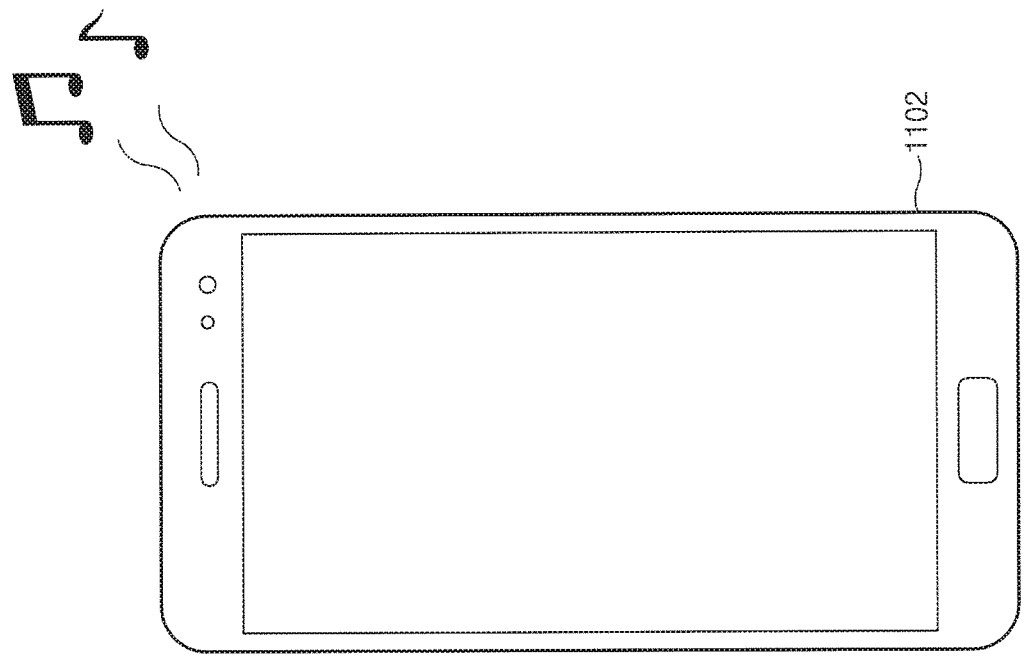
FIG. 11 illustrates a view for explaining that a control message is transmitted to an external device through an operation of an electronic device according to various embodiments of the present disclosure.
Figure 11:
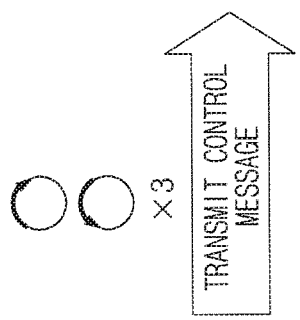
Figure 11:
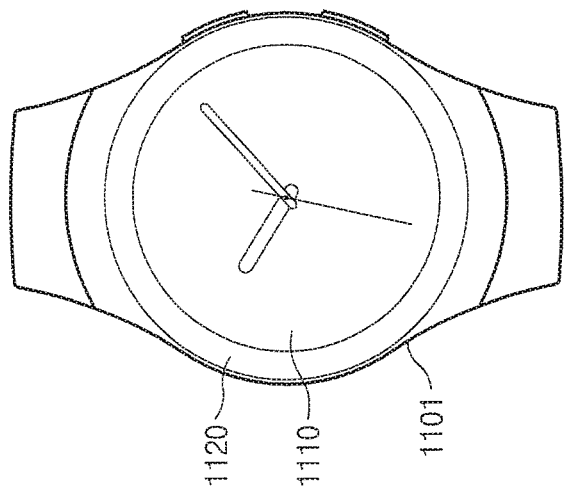

FIG. 11 is a view for explaining that a control message is transmitted to an external device through an operation of an electronic device according to another embodiment.

FIG. 11 illustrates an electronic device 1101 and an external device 1102. The external device 1102, for example, may correspond to a device (e.g., a smartphone) that includes at least some of the configurations of the electronic device 1101 or include a similar configuration. For example, the external device 1102 may correspond to the electronic device 202 of FIG. 2.

According to an embodiment, the owners of the electronic device 1101 and the external device 1102 may be the same. Further, the electronic device 1101 and the external device 1102, for example, may communication with each other through short range communication (e.g., BLUETOOTH, ZIGBEE, or Wi-Fi Direct).

According to an embodiment, "switching of directions of three times or more for two seconds (hereinafter, a fourth switching pattern)" may be designated in advance in the memory of the electronic device 1101. Further, in the memory, the fourth switching pattern may correspond to a functional operation related to transmission of a control message. According to an embodiment, the control message may include an instruction related to a function control of the external device 1102. For example, the control message may include an instruction that forces the external device 1102 to ring a bell sound.

For example, a screen including an image of a watch may be output on a display 1110 of the electronic device 1101. The rotation member 1120 of the electronic device 1101, for example, may alternately rotate clockwise (CW) two times and counterclockwise (CCW) two times, for 2 seconds, through manipulation of the user who forget the location of the external device 1102. As the rotation of the rotation member 1120 matches with the fourth switching pattern, the electronic device 1101 may transmit the control message to the external device 1102. The external device 1102 may compulsorily ring a bell sound in response to the reception of the control message.

Figure 12:
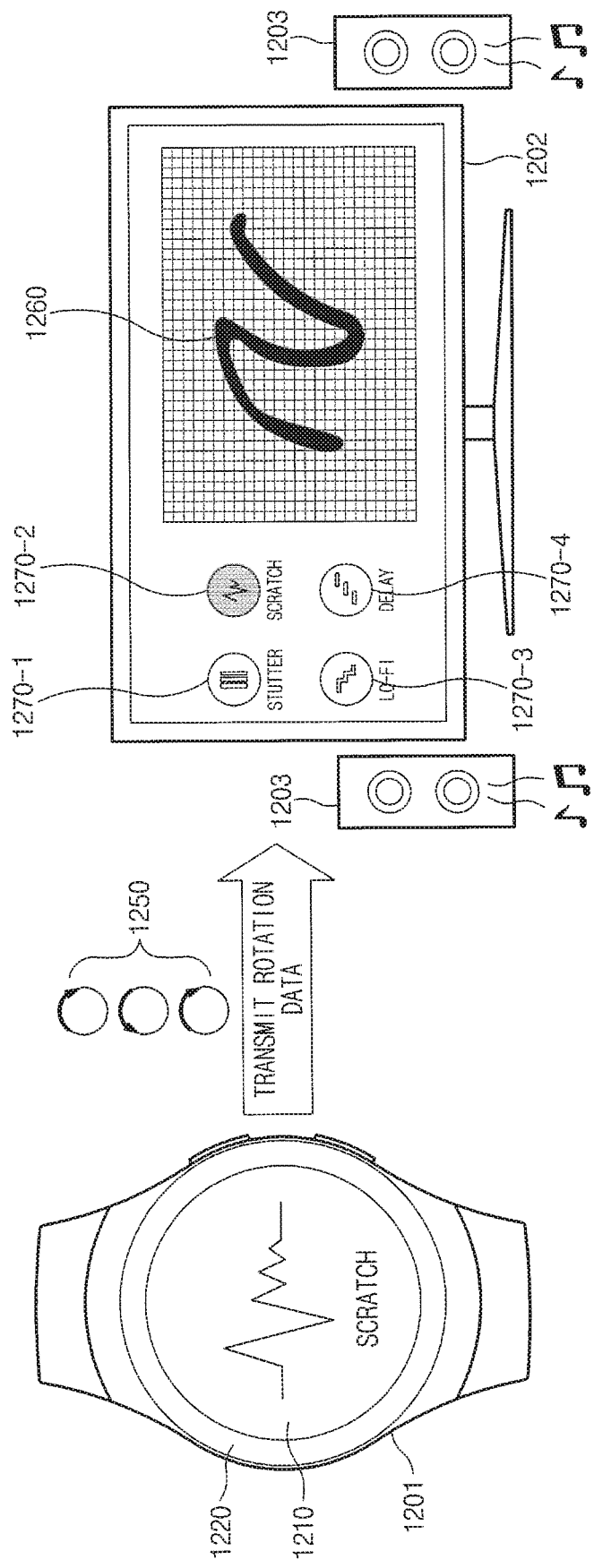
FIG. 12 illustrates a view for explaining that rotation data is transmitted to an external device through an operation of an electronic device according to various embodiments of the present disclosure.

FIG. 12 is a view for explaining that rotation data is transmitted to an external device through an operation of an electronic device according to another embodiment.

FIG. 12 illustrates an electronic device 1201 and an external device 1202. The external device 1202, for example, may correspond to a device (e.g., a smart TV) that includes a configuration corresponding to the configuration of the electronic device 1001. For example, the external device 1202 may correspond to the electronic device 202 of FIG. 2.

According to an embodiment, the electronic device 1201 and the external device 1202, for example, may communication with each other through short range communication (e.g., BLUETOOTH, ZIGBEE, or Wi-Fi Direct). Further, the external device 1202, for example, may be connected to an embedded audio output module (e.g., a speaker module) and/or an external audio output device 1203 to convert an audio signal based on playback of a sound source into a sound.

According to an embodiment, a music editing application (e.g., SOUNDCAMP™) may be executed by the external device 1202 and a specific sound source may be being played. According to an embodiment, the external device 1202 may apply various types of sound effects to the sound source that is being played.

For example, when an icon 1270-2 is selected, the external device 1202 may apply a scratching effect to the sound source that is being played, based on trace data 1260. The trace data 1260 may correspond to user input data in a two-dimensional parameter space.

According to an embodiment, the electronic device 1201 may generate rotation input data 1250 based on the rotation of the rotation member 1220, and may transmit the rotation input data 1250 to the external device 1202. The rotation input data 1250 may be converted to trace data 1260 based on setting of the scratching effect in the external device. That is, the rotation pattern of the rotation member 1220 provided in the electronic device 1201 may be transmitted to the external device 1202, be converted to the trace data 1260, and be used by the external device 1202.

According to various embodiments, in the external device 1202, if an icon 1270-1 is selected, a stuttering effect may be applied to the sound source that is being played, if an icon 1270-4 is selected, a delaying effect may be applied to the sound source that is being played, and if an icon 1270-3 is selected, a low fidelity effect (Lo-Fi) effect may be applied to the sound source that is being played.

According to various embodiments, the various types of sound effects may be generated even when the music playback application as well as the music editing application is executed. For example, the rotation member rotates and the rotational direction switching operation is performed while the sound source is played by the music playback application, the various sound effects may be applied to the sound source that is being played based on the operations.

Figure 13:
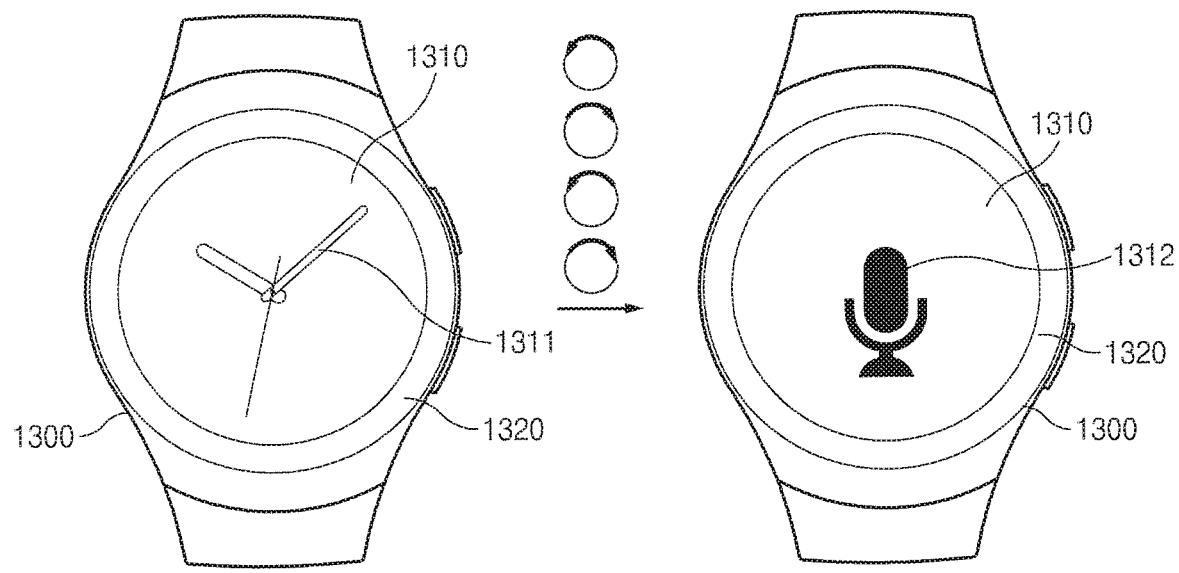
FIG. 13 illustrates a view for explaining that a specific application is executed through an operation of an electronic device according to various embodiments of the present disclosure.

FIG. 13 is a view for explaining that execution of an application is controlled through an operation of an electronic device according to another embodiment.

FIG. 13 illustrates an electronic device 1300. For example, "one clockwise (CW) rotation, one counterclockwise (CCW) rotation, one clockwise (CW) rotation, and one counterclockwise (CCW) rotation, for 1.5 seconds (hereinafter, a fifth switching pattern)" may be designated in advance in the memory of the electronic device 1300. Further, in the memory, the fifth switching pattern may correspond to a functional operation related to execution of a specific application. For example, the fifth switching pattern may correspond to a functional operation of executing (or activating) a voice recognition application (e.g., S-VOICE™).

For example, a standby screen 1311 (e.g., including an image of a watch) may be output on a display 1310 of the electronic device 1300. A rotation member 1320 of the electronic device 1300 may rotate once clockwise (CW), once counterclockwise (CCW), once clockwise (CW), and once counterclockwise (CCW), for 1.5 seconds. As this matches with the fifth switching pattern, the electronic device 1300 may execute or activate the voice recognition application. Accordingly, a screen 1312 that includes an icon indicating a voice recognition application may be output on the display 1310 of the electronic device 1300, and a microphone provided in the electronic device 1300 may be activated.

Further, according to various embodiments, the specific application corresponding to the fifth switching pattern is not limited to the voice recognition application. The specific application may be variously selected based on setting of the user. For example, a communication application may be selected. Further, the display 1310 may be in an off state in which no content is output, instead of outputting a standby screen 1311 including the image of the watch.

Figure 14:
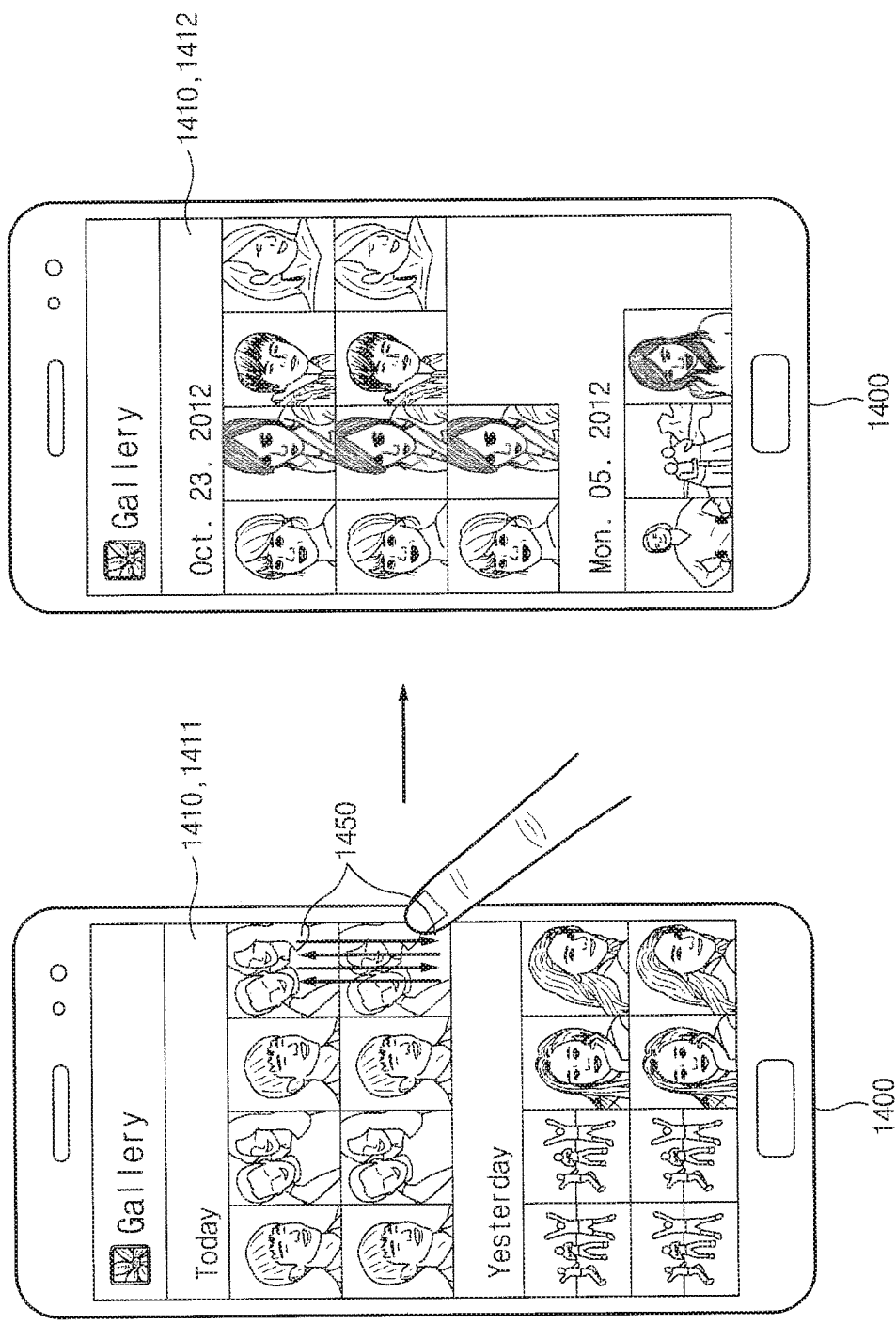
FIG. 14 illustrates a view for explaining that a scroll location is modified through an operation of an electronic device according to various embodiments of the present disclosure.

FIG. 14 is a view for explaining that a scroll location is modified through an operation of an electronic device according to another embodiment.

Referring to FIG. 14, an electronic device 1400 is illustrated. For example, "switching of directions by touch moves of three times for 1 second (hereinafter, a sixth switching pattern)" may be designated in advance in the memory of the electronic device 1400. Further, in the memory, the sixth switching pattern may correspond to a functional operation related to scrolling of the screen. For example, the sixth switching pattern may correspond to a functional operation of moving to a scroll location of an uppermost end or a lowermost end of the screen.

For example, an execution screen 1411 of an image viewer application (e.g., a gallery application) may be output on a display 1410 of the electronic device 1400. For example, the most recently generated images may be listed based on the time sequence in the execution screen 1411.

According to an embodiment, the user may alternately perform an upward touch movement and a downward touch movement two times, for 1 second, on the display 1410 provided with a touch panel, by using a part (e.g., a finger) of his or her body. As this matches with the sixth switching pattern, the electronic device 1400 may move the scroll location and may output a screen 1412 in which an image that was generated earliest is listed.

According to various embodiments, the functional operation of modifying the scroll location may be applied to various applications (e.g., a web browser application and a document viewer application) that require scrolling.

Figure 15:
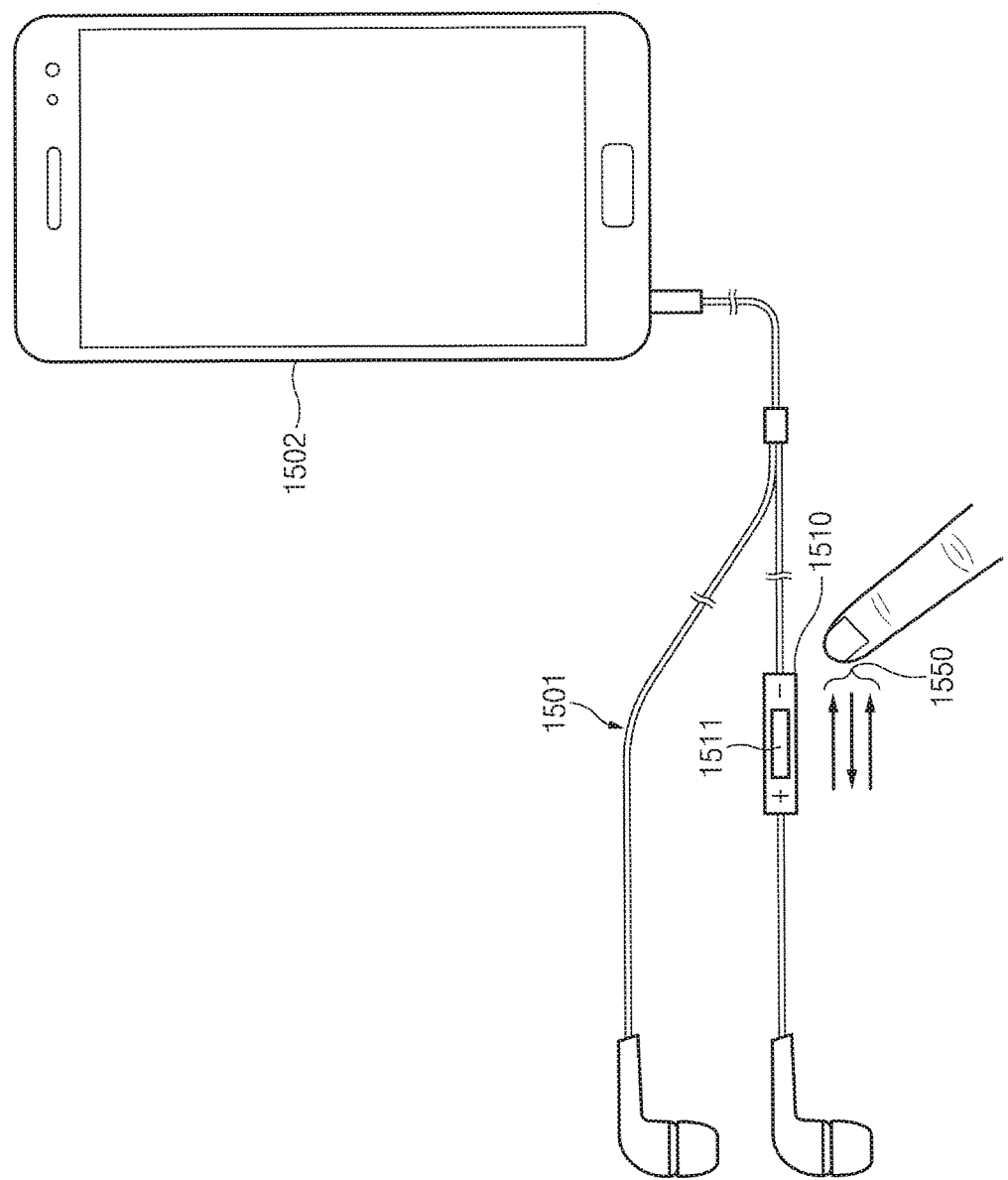
FIG. 15 illustrates a view for explaining that a playback mode of a sound source is modified through an operation of an electronic device according to various embodiments of the present disclosure.

FIG. 15 is a view for explaining that a playback mode of a sound source is modified through an operation of an electronic device according to another embodiment.

Referring to FIG. 15, an earphone 1501 provided with a volume control module 1510, and an electronic device 1502 coupled to the earphone 1501 are illustrated. For example, the electronic device 1502 may play back a sound source by using a music playback application. The electronic device 1502 generates a sound signal by playing back the sound source, and may provide the generated sound signal to the earphone 1501 through a sound interface.

The earphone 1501, for example, may convert the electrical sound signal that was received from the electronic device 1502 to a sound wave to provide the sound wave to the user. According to an embodiment, the earphone 1501 may include a volume control module 1510 for controlling a volume corresponding to the amplitude of the sound wave. For example, the user may perform a touchdown or a touch move on the touch panel 1511 provided in the volume control module 1510 to increase or decrease the volume.

According to an embodiment, "switching of directions by touch moves of two times for one second (hereinafter, a seventh switching pattern)" may be designated in advance in the memory of the electronic device 1502. Further, in the memory, the seventh switching pattern may correspond to a functional operation related to a playback mode of the sound source. For example, the seventh switching pattern may correspond to a functional operation of setting or releasing a shuffle playback mode.

For example, while the electronic device 1502 executes a music playback application, the user may sequentially perform a rightward touch move, a leftward touch move, and a rightward touch move, for 1 second, on the touch panel 1511 provided in the volume control module 1510, by using a part (e.g., a finger) of his or her body. As this matches with the seventh switching pattern, the electronic device 1502 may set or release the shuffler playback mode.

According to various embodiments, the seventh switching pattern may correspond to at least one of a playback/stop of a multimedia content, modification of a played sound source, or setting/release of a repeated playback mode, in addition to setting/release of the shuffle playback mode.

Figure 16:
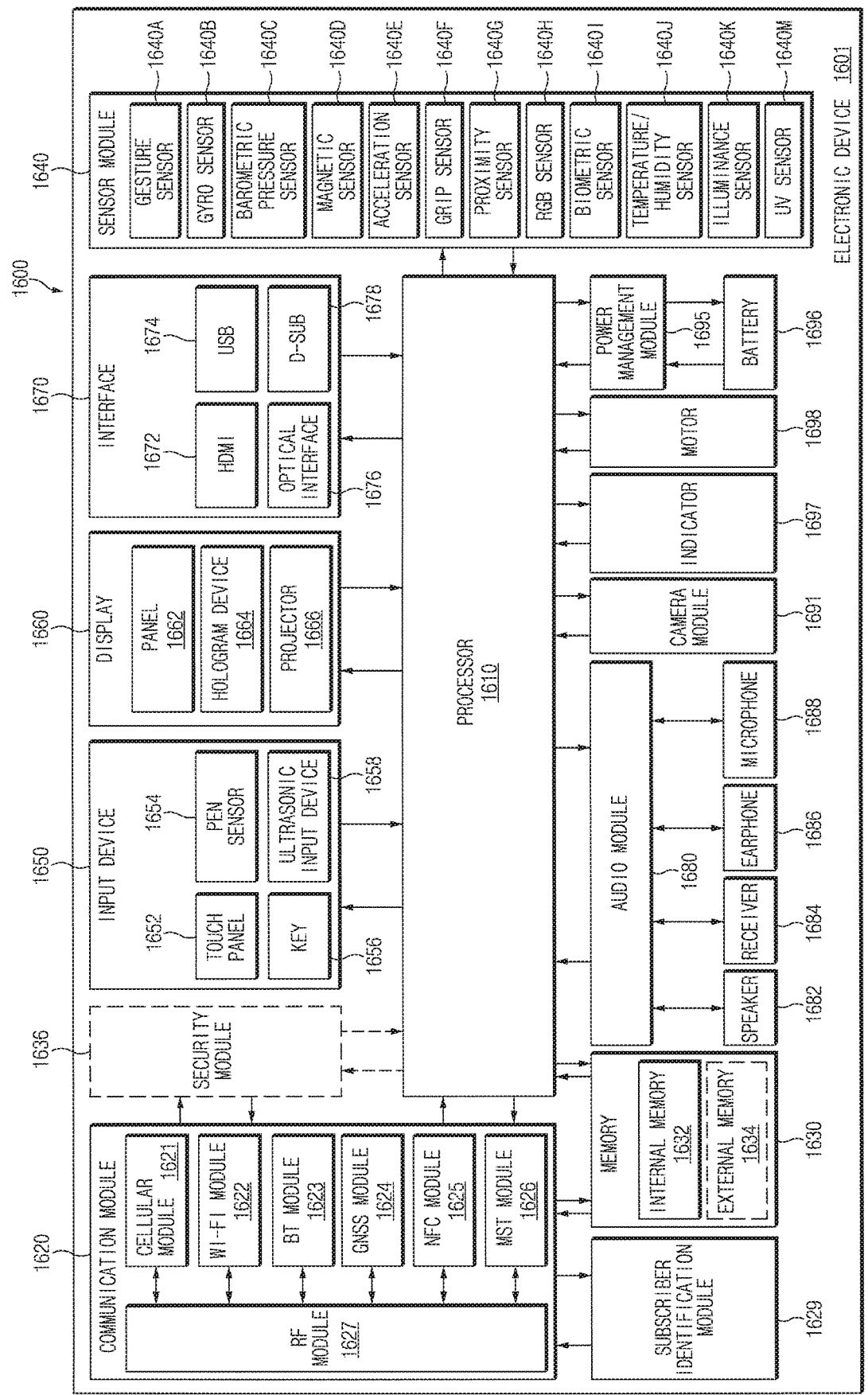
FIG. 16 illustrates a block diagram of an electronic device according to various embodiments.

FIG. 16 is a block diagram of an electronic device according to various embodiments.

Referring to FIG. 16, an electronic device 1601 may include, for example, the whole part or a part of the electronic device 201 illustrated in FIG. 2. The electronic device 1601 may include at least one processor 1610 (e.g., an application processor (AP)), a communication module 1620, a subscriber identification module (SIM) card 1629, a memory 1630, a sensor module 1640, an input device 1650, a display 1660, an interface 1670, an audio module 1680, a camera module 1691, a power management module 1695, a battery 1696, an indicator 1697, or a motor 1698.

The processor 1610 may control a plurality of hardware or software components connected to the processor 1610 by driving an operating system or an application program and perform a variety of data processing and calculations. The processor 1610 may be implemented by, for example, a system on chip (SoC). According to an embodiment, the processor 1610 may further include a graphical processing unit (GPU) and/or an image signal processor. The processor 1610 may include at least some (e.g., a cellular module 1621) of the components illustrated in FIG. 2. The processor 1610 may load instructions or data, received from at least one other component (e.g., a non-volatile memory), in a volatile memory to process the loaded instructions or data, and may store various types of data in a non-volatile memory.

The communication module 1620 may have the same or similar structure to the communication circuit 250 of FIG. 2. The communication module 1620 may include, for example, a cellular module 1621, a Wi-Fi module 1622, a BLUETOOTH module 1623, a GNSS module 1624 (e.g., a GPS module, a GLONASS module, a BEIDOU module, or a GALILEO module), an NFC module 1625, an MST module 1626, and a radio frequency (RF) module 1627.

The cellular module 1621 may provide a voice call, a video call, a text message service, or an Internet service through, for example, a communication network. According to an embodiment, the cellular module 1621 may distinguish between and authenticate electronic devices 1601 within a communication network using a subscriber identification module (e.g., the SIM card 1629). According to an embodiment, the cellular module 1621 may perform at least some of the functions that the processor 1610 may provide. According to an embodiment of the present disclosure, the cellular module 1621 may include a communication processor (CP).

Each of the Wi-Fi module 1622, the BLUETOOTH module 1623, the GNSS module 1624, the NFC module 1625, or the MST module 1626, for example, may include a processor for processing data transmitted/received through the corresponding module. According to some embodiments, at least some (e.g., two or more) of the cellular module 1621, the Wi-Fi module 1622, the BLUETOOTH module 1623, the GNSS module 1624, the NFC module 1625, and the MST module 1626 may be included in one integrated chip (IC) or IC package.

The RF module 1627 may transmit/receive, for example, a communication signal (e.g., an RF signal). The RF module 1627 may include, for example, a transceiver, a power amp module (PAM), a frequency filter, a low noise amplifier (LNA), or an antenna. According to another embodiment, at least one of the cellular module 1621, the Wi-Fi module 1622, the BLUETOOTH module 1623, the GNSS module 1624, the NFC module 1625, or the MST module 1626 may transmit and receive an RF signal through a separate RF module.

The subscriber identification module 1629 may include, for example, a card including a subscriber identification module and/or an embedded SIM, and may further include unique identification information (e.g., an integrated circuit card identifier (ICCID)) or subscriber information (e.g., international mobile subscriber identity (IMSI)).

The memory 1630 (e.g., the memory 230) may include, for example, an internal memory 1632 or an external memory 1634. The internal memory 1632 may include at least one of, for example, a volatile memory (e.g., a dynamic random access memory (DRAM), a static RAM (SRAM), a synchronous dynamic RAM (SDRAM), and the like) and a non-volatile memory (e.g., a one-time programmable read only Memory (OTPROM), a programmable ROM (PROM), an erasable and programmable ROM (EPROM), an electrically erasable and programmable ROM (EEPROM), a flash memory (e.g., a NAND flash memory or a NOR flash memory), a hard driver, or a solid state drive (SSD)).

The external memory 1634 may further include a flash drive, for example, a compact flash (CF), a secure digital (SD), a micro secure digital (Micro-SD), a mini secure digital (Mini-SD), an extreme digital (xD), a memory stick, or the like. The external memory 1634 may be functionally and/or physically connected to the electronic device 1601 through various interfaces.

The security module 1636 is a module including a storage space having a relatively high security level as compared with the memory 1630, and may be a circuit that guarantees safe data storage and a protected execution environment. The security module 1636 may be implemented by a separate circuit, and may include a separate processor. The security module 1636, for example, may be present in a detachable smart chip or a secure digital (SD) card, or may include an embedded secure element (eSE) embedded in a fixed chip of the electronic device 1601. Further, the security module 1636 may be driven by an operation system (OS) that is different from the operating system of the electronic device 1601. For example, the security module 1636 may be operated based on a java card open platform (JCOP) operating system.

The sensor module 1640, for example, may measure a physical quantity or detect an operational state of the electronic device 1601, and may convert the measured or detected information to an electrical signal. The sensor module 1640 may include, for example, at least one of a gesture sensor 1640A, a gyro sensor 1640B, an atmospheric pressure sensor 1640C, a magnetic sensor 1640D, an acceleration sensor 1640E, a grip sensor 1640F, a proximity sensor 1640G, a color sensor 1640H (e.g., a RGB sensor), a biometric sensor 1640I, a temperature/humidity sensor 1640J, an illumination sensor 1640K, and an ultraviolet (UV) sensor 1640M. Additionally or alternatively, the sensor module 1640 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1640 may further include a controller for controlling one or more sensors included therein. In some embodiments, the electronic device 1601 may further include a processor configured to control the sensor module 1640 as a part of or separately from the processor 1610, and may control the sensor module 1640 while the processor 1610 is in a sleep state.

The input device 1650 may include, for example, a touch panel 1652, a (digital) pen sensor 1654, a key 1656, or an ultrasonic input device 1658. The touch panel 1652 may use at least one of, for example, a capacitive type, a resistive type, an infrared type, and an ultrasonic type. The touch panel 1652 may further include a controller. The touch panel 1652 may further include a tactile layer, and provide a tactile reaction to a user.

The (digital) pen sensor 1654 may include, for example, a recognition sheet that is a part of the touch panel or a separate recognition sheet. The key 1656 may include, for example, a physical button, an optical key, or a keypad. The ultrasonic input device 1658 may detect ultrasonic waves generated by an input tool through a microphone (e.g., a microphone 1688) and may identify data corresponding to the detected ultrasonic waves.

The display 1660 (e.g., the display 260) may include a panel 1662, a hologram device 1664, or a projector 1666. The panel 1662 may include a component equal or similar to the display 260 of FIG. 2. The panel 1662 may be implemented to be, for example, flexible, transparent, or wearable. The panel 1662 may be formed as a single module together with the touch panel 1652. The hologram device 1664 may show a three dimensional image in the air using an interference of light. The projector 1666 may display an image by projecting light onto a screen. The screen may be located, for example, in the interior of or on the exterior of the electronic device 1601. According to an embodiment of the present disclosure, the display 1660 may further include a controller for controlling the panel 1662, the hologram device 1664, or the projector 1666.

The interface 1670 may include, for example, a high-definition multimedia interface (HDMI) 1672, a universal serial bus (USB) 1674, an optical interface 1676, or a D-subminiature (D-sub) 1678. The interface 1670 may be included in, for example, the communication circuit 250 illustrated in FIG. 2. Additionally or alternatively, the interface 1670 may include, for example, a mobile high-definition link (MHL) interface, a secure digital (SD) card/ multimedia card (MMC) interface, or an infrared data association (IrDA) standard interface.

The audio module 1680 may bilaterally convert, for example, a sound and an electrical signal. At least some elements of the audio module 1680 may be included in, for example, the input/output interface 270 illustrated in FIG. 2. The audio module 1680 may process sound information input or output through, for example, a speaker 1682, a receiver 1684, earphones 1686, the microphone 1688, or the like.

The camera module 1691 is a device that may photograph a still image and a dynamic image. According to an embodiment, the camera module 1691 may include one or more image sensors (e.g., a front sensor or a back sensor), a lens, an image signal processor (ISP) or a flash (e.g., an LED or xenon lamp).

The power management module 1695 may manage, for example, power of the electronic device 1601. According to an embodiment of the present disclosure, the power management module 1695 may include a power management integrated circuit (PMIC), a charger integrated circuit (IC), or a battery or fuel gauge. The PMIC may have a wired and/or wireless charging scheme. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 1696, and a voltage, a current, or a temperature while charging. The battery 1696 may include, for example, a rechargeable battery and/or a solar battery.

The indicator 1697 may indicate particular status of the electronic device 1601 or a part thereof (e.g., the processor 1610), for example, a booting status, a message status, a charging status, or the like. The motor 1698 may convert an electrical signal into mechanical vibrations, and may generate a vibration or haptic effect. Although not illustrated, the electronic device 1601 may include a processing device (e.g., a GPU) for supporting mobile TV. The processing unit for supporting mobile TV may process, for example, media data pursuant to a certain standard of digital multimedia broadcasting (DMB), digital video broadcasting (DVB), or media flow (MEDIAFLOW™).

Each of the elements described in the specification may include one or more components, and the terms of the elements may be changed according to the type of the electronic device. In various embodiments of the present disclosure, the electronic device may include at least one of the elements described in the specification, and some elements may be omitted or additional elements may be further included. Some of the elements of the electronic device according to various embodiments of the present disclosure may be coupled to form one entity, and may perform the same functions of the corresponding elements before they are coupled.

Figure 17:
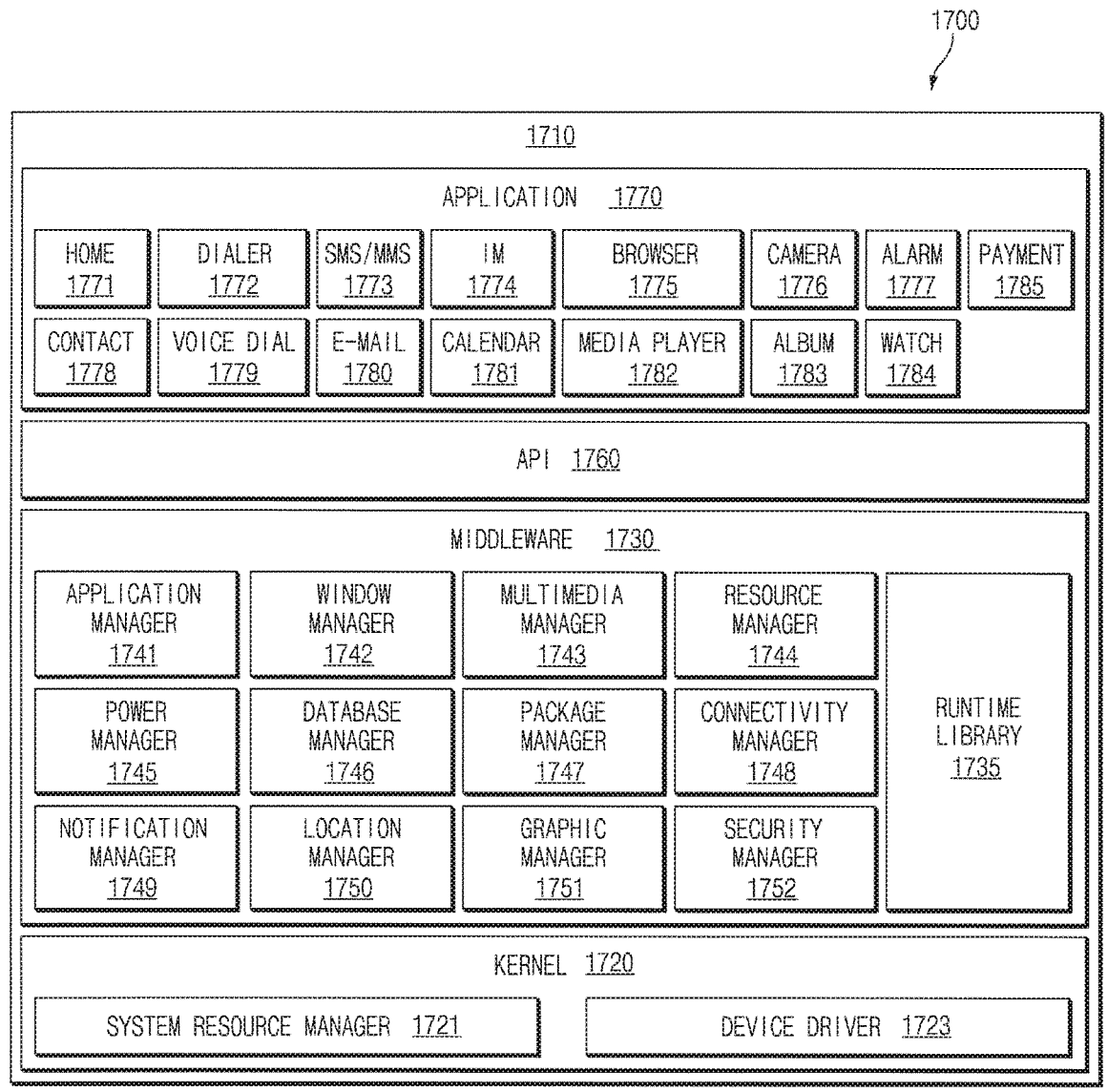
FIG. 17 illustrates a block diagram of a program module according to various embodiments.

FIG. 17 illustrates a block diagram of a program module according to various embodiments.

According to an embodiment, the program module 1710 (e.g., a program 240) may include an operating system (OS) that controls resources related to an electronic device (e.g., the electronic device 201), and various application programs (e.g., an application program 247) that is driven on an operating system. The operating system may be, for example, ANDROID, iOS, WINDOWS, SYMBIAN, TIZEN, BADA, or the like.

The program module 1710 may include a kernel 1720, a middleware 1730, an API 1760, or applications 1770. At least a part of the program module 1710 may be preloaded on an electronic device or may be downloaded from external electronic devices (e.g., external electronic devices 202 and 204 and a server 206).

The kernel 1720 (e.g., the kernel 241) may include, for example, a system resource manager 1721, or a device driver 1723. The system resource manager 1721 may control, allocate, or retrieve the system resources. According to one embodiment, the system resource manager 1721 may include a process management unit, a memory management unit, or a file system management unit. The device driver 1723 may include, for example, a display driver, a camera driver, a BLUETOOTH driver, a shared-memory driver, a USB driver, a keypad driver, a Wi-Fi driver, an audio driver, or an inter-process communication (IPC) driver.

The middleware 1730 may provide a function required by the applications 1770 in common or provide various functions to the applications 1770 through the API 1760 so that the applications 1770 can efficiently use limited system resources of the electronic device. According to an exemplary embodiment, the middleware 1730 (e.g., the middleware 263) may include, for example, at least one of a runtime library 1735, an application manager 1741, a window manager 1742, a multimedia manager 1743, a resource manager 1744, a power manager 1745, a database manager 1746, a package manager 1747, a connectivity manager 1748, a notification manager 1749, a location manager 1750, a graphic manager 1751, a security manager 1752, and a payment manager.

The run time library 1735 may include, for example, a library module that a compiler uses in order to add new functions through a programming language while the applications 1770 are executed. The run time library 1735 may perform input/output management, memory management, or a function for an arithmetic function.

The application manager 1741, for example, may manage a lifecycle of at least one of the applications 1770. The window manager 1742 may manage a GUI resource used in a screen. The multimedia manager 1743 may detect a format required for playing back various media files and encode or decode a media file using a codec appropriate for the corresponding format. The resource manager 1744 may manage resources, such as a source code, a memory, or a storage space, of at least one of the applications 1770.

The power manager 1745 may operate together with, for example, a basic input/output system (BIOS), so as to manage a battery or power and may provide power information required for the operation of the electronic device. The database manager 1746 may generate, search for, or change a database to be used by at least one of the applications 1770. The package manager 1747 may manage the installation or the updating of applications distributed in a package file form.

For example, the connectivity manager 1748 may manage wireless connections, such as Wi-Fi or BLUETOOTH. The notification manager 1749 may display or notify an event such as a received message, an appointment, a proximity notification, and the like to a user without disturbance. The location manager 1750 may manage location information of the electronic device. The graphic manager 1751 may manage graphic effects to be provided to a user and user interfaces related to the graphic effects. The security manager 1752 may provide various security functions required for system security or user authentication. According to an embodiment of the present disclosure, when the electronic device (e.g., the electronic device 201) has a phone function, the middleware 1730 may further include a telephony manager for managing a voice or video communication function of the electronic device.

The middleware 1730 may include a middleware module for forming a combination of various functions of the aforementioned components. The middleware 1730 may provide modules specialized according to the type of OS in order to provide differentiated functions. In addition, some existing components may be dynamically removed from the middleware 1730, or new components may be added to the middleware 1730.

The API 1760 (e.g., the API 245) is, for example, a set of API programming functions, and may be provided another configuration according to an operating system. For example, for each platform, one API set may be provided in a case of ANDROID or iOS, and two or more API sets may be provided in a case of TIZEN.

The application 1770 (e.g., the application program 247) may include, for example, a home 1771, a dialer 1772, an SMS/MMS 1773, an instant message (IM) 1774, a browser 1775, a camera 1776, an alarm 1777, a contact 1778, a voice dial 1779, an e-mail 1780, a calendar 1781, a media player 1782, an album 1783, a watch 1784, or at least one application that may provide health care (e.g., measuring an exercise degree or blood glycose) or environmental information.

According to an embodiment, the application 1770 may include an application (hereinafter, referred to as "an information exchange application for convenience of description") that supports exchange of information between the electronic device (e.g., the electronic device 201) and external electronic device (e.g., the external electronic device 202 and 204). The information exchange application may include, for example, a notification relay application for forwarding specific information to an external electronic device, or a device management application for managing an external electronic device.

For example, the notification relay application may have a function of forwarding, to external electronic devices (e.g., the electronic devices 202 and 204), notification information generated from other applications of the electronic device (e.g., an SMS/MMS application, an e-mail application, a health care application, and an environmental information application). The notification relay application may receive notification information from, for example, an external electronic device and provide the received notification information to a user.

The device management application may, for example, manage (e.g., install, delete, or update) a function for at least a part of an external electronic device (e.g., the electronic device 202 or 204) communicating with the electronic device (e.g., activating/deactivating the external electronic device itself (or some components thereof) or adjusting the brightness (or resolution) of a display), an application operating in the external electronic device, or a service provided from the external electronic device (e.g., a telephone call service or a message service).

According to an embodiment, the application 1770 may include an application (e.g., a health management application) designated according to an attribute of an external electronic device (e.g., an electronic device 202 or 204). According to an embodiment, the application 1770 may include an application that is received from an external electronic device (e.g., the server 206 or the device 202 or 204). According to an embodiment of the present disclosure, the applications 1770 may include a preloaded application or a third party application that is downloaded from a server. The names of the elements of the program module 1710 according to the illustrated embodiment may vary according to the type of the operating system.

According to various embodiments, at least a part of the program module 1710 may be implemented by software, firmware, hardware, or combination of two or more thereof. At least a part of the program module 1710, for example, may be implemented (e.g., executed) by a processor (e.g., the processor 1610). At least a part of the program module 1710 may include, for example, a module, a program routine, a set of instructions, or a process for performing at least one function.

In accordance with an aspect of the present disclosure, there is provided an electronic device including a rotation member being rotatable in a first direction or a second direction, a memory configured to store a specific rotation pattern, and a controller configured to, if a rotation pattern of the rotation member between the first direction and the second direction matches with the specific rotation pattern, perform a functional operation corresponding to the specific rotation pattern.

According to an embodiment, the specific rotation pattern may be set based on a number of switching of rotational directions of the rotational member between the first direction and the second direction for a specific time period.

According to an embodiment, the rotation member may have a ring shape surrounding a periphery of the electronic device and may be rotatable about a center of a surface of the electronic device.

According to an embodiment, the rotation member may provide discrete haptic responses at a specific rotation angle interval range during rotation thereof.

According to an embodiment, the controller may be configured to further perform a functional operation corresponding to rotation of the rotation member in the first direction or a functional operation corresponding to rotation of the rotation member in the second direction.

According to an embodiment, the functional operation corresponding to the specific rotation pattern may depend on an application being executable by the electronic device.

According to an embodiment, if the rotation pattern of the rotation member matches with the specific rotation pattern, the controller may be configured to perform a functional operation related to playback of a multimedia content.

According to an embodiment, the functional operation related to the playback of the multimedia content may include at least one of playback and stop of the multimedia content, playback of a next multimedia content, playback of a previous multimedia content, setting of a shuffle playback mode, release of the shuffle playback mode, setting of a repeated playback mode, or release of the repeated playback mode.

According to an embodiment, the electronic device may further include a display configured to output a content, and if the rotation pattern of the rotation member matches with the specific rotation pattern, the controller may be configured to perform a functional operation for changing an output magnification of the content.

According to an embodiment, the electronic device may further include a communication circuit configured to communicate with an external device by using a specific protocol, and if the rotation pattern of the rotation member matches with the specific rotation pattern, the controller may be configured to transmit a specific message to the external device through the communication circuit.

According to an embodiment, the external device that receives the specific message may be designated in advance, and the specific message may include at least one of a specific text or a specific image.

According to an embodiment, the external device that receives the specific message may be connected to the electronic device through short range communication, and the specific message may include an instruction on a functional operation of the external device.

In accordance with another aspect of the present disclosure, there is provided a user interfacing method of an electronic device including a rotation member, the user interfacing method including receiving at least one rotation of the rotation member in a first direction and at least one rotation of the rotation member in a second direction from the rotation member, and if a rotation pattern of the rotation member matches with a specific rotation pattern, performing a functional operation corresponding to the specific rotation pattern.

According to an embodiment, the specific rotation pattern may be set based on a number of switching of rotational directions of the rotation member between the first direction and the second direction for a specific time period.

According to an embodiment, the user interfacing method may further include performing a functional operation corresponding to the at least one rotation of the rotation member in the first direction and a functional operation corresponding to the at least one rotation of the rotation member in the second direction.

According to an embodiment, the functional operation corresponding to the specific rotation pattern may be differently set based on an application being executable by the electronic device.

According to an embodiment, the functional operation corresponding to the specific rotation pattern may include a functional operation related to playback of a multimedia content.

According to an embodiment, the functional operation corresponding to the specific rotation pattern may include a functional operation of changing an output magnification of a content output on a display.

According to an embodiment, the functional operation corresponding to the specific rotation pattern may include a functional operation of transmitting a specific message to an external device.

In accordance with another aspect of the present disclosure, there is provided a computer-readable recording medium in which instructions being executable by at least one processor of an electronic device and being readable by a computer are stored, wherein the instructions are configured to perform an operation of receiving at least one rotation in a first direction and at least one rotation in a second direction from a rotation member, and an operation of, if a rotation pattern of the rotation member matches with a specific rotation pattern, performing a functional operation corresponding to the specific rotation pattern.

In accordance with another aspect of the present disclosure, there is provided an electronic device including a housing, a circular display exposed to one surface of the housing, a wheel structure arranged on the one surface of the housing and being rotatable in a first direction and a second direction opposite to the first direction while surrounding the circular display, a sensor configured to detect rotation of the wheel structure, a processor arranged within the housing and electrically connected to the display and the sensor, and a memory electrically connected to the processor, and the memory may store instructions, when executed, cause the processor to display a first screen on the display, monitor rotation of the wheel structure by using the sensor, determine whether the wheel structure alternately rotates in the first direction and the second direction for a specific time period, at least partially based on the monitored rotation of the wheel structure, and modify at least a portion of the first screen to display the modified portion of the first screen on the display or perform a specific function of the electronic device, at least partially based on the determination.

According to an embodiment, the instructions may cause the processor to monitor a rotational direction or a rotation distance of the wheel structure, by using the sensor.

According to an embodiment, the sensor may include an optical sensor or a magnetic sensor.

According to an embodiment, the instructions may cause the processor to determine whether the wheel structure performs a first rotation in the first direction by at least first rotation distance and performs a second rotation in the second direction by at least second rotation distance immediately after the first rotation for the specific time period.

According to an embodiment, the instructions may cause the processor to determine whether the wheel structure performs a third rotation in the first direction by at least a third rotation distance, immediately after the second rotation, and performs a fourth rotation in the second direction by at least a fourth rotation distance immediately after the third rotation for the specific time period.

According to an embodiment, the third rotation distance may correspond to the first rotation distance and the fourth rotation distance may correspond to the second rotation distance.

According to an embodiment, the instructions may cause the processor to when the processor determines that one of the first to fourth rotations or a combination of two or more thereof is performed, perform at least one corresponding function of a plurality of functions of the electronic device.

According to an embodiment, the electronic device may further include a sound interface, and the instructions may cause the processor to modify a sound signal provided to the sound interface, at least partially based on the determination.

The term "module" used in the specification may mean a unit including, for example, one of hardware, software, or firmware or a combination of the two or more of them. The module may be interchangeably used, for example, with a unit, logic, a logical block, a component, or a circuit. The module may be a minimum unit or a part of an integrally configured part. The module may be a minimum unit or a part that performs one or more functions. The module may be implemented mechanically or electromagnetically. For example, the module may include at least one of an application-specific integrated circuit (ASIC) chip, a field-programmable gate array, or a programmable-logic device, which has been known, will be developed in the future, or performs certain operations.

At least some of the devices (e.g., modules or functions) or methods (e.g., operations) according to various embodiments of the present disclosure may be implemented by an instruction stored in a computer-readable storage medium, for example, in the form of a program module. When the instruction is executed by the processor (e.g., the processor 280), the at least one processor may perform a function corresponding to the instruction. The computer-readable storage medium may be, for example, a memory 230.

The computer-readable storage medium may include a hard disk, a floppy disk, a magnetic medium (e.g., a magnetic tape), an optical medium (e.g., a compact disk read only memory (CD-ROM)), a digital versatile disk (DVD), a magneto-optical medium (e.g., a floptical disk), a hardware device (e.g., a read only memory (ROM), a random access memory (RAM), or a flash memory). Further, the program instructions may include high-level language codes that may be executed by a computer using an interpreter as well as machine languages created by using a compiler. The above-mentioned hardware device may be configured to be operated as one or more software module to perform operations of various embodiments, and the converse is true.

The module or program module according to various embodiments of the present disclosure may include at least one of the above-mentioned element, omit some of them, or further include other elements. The module, the program module, or the operations performed by other elements according to various embodiments of the present disclosure may be performed in a sequential, parallel, iterative, or heuristic method. Further, some operations may be executed in another sequence or may be omitted, or other operations may be added.

According to embodiments of the present disclosure, the electronic device may perform various functional operations based on a rotation pattern between a first rotational direction and a second rotational direction of the rotation member. Through this, the rotation pattern of the rotation member may be utilized as a new user interface. In addition, the present disclosure may provide various effects that are directly or indirectly recognized.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
   a rotation member configured to rotate in a first direction and a second direction;
   a memory configured to store a specific direction switching pattern; and
   a controller configured to:
      receive a direction switching pattern of alternating at least one rotation in the first direction and at least one rotation in a second direction from the rotation member,
      determine, after the direction switching pattern is completed, whether the direction switching pattern of the rotation member switching between the first direction and the second direction matches with the specific direction switching pattern, and
      perform a functional operation corresponding to the specific direction switching pattern, wherein the specific direction switching pattern is set based on a number of switching rotational directions between the first direction and the second direction for a specific time period.

2. The electronic device of claim 1, wherein the rotation member is structured with a ring shape surrounding a periphery of the electronic device and is rotatable about a center of a surface of the electronic device.

3. The electronic device of claim 1, wherein the rotation member provides discrete haptic responses at a specific rotation angle range during rotation thereof.

4. The electronic device of claim 1, wherein the controller is configured to further perform a functional operation corresponding to rotation of the rotation member in the first direction or a functional operation corresponding to rotation of the rotation member in the second direction.

5. The electronic device of claim 1, wherein the functional operation corresponding to the specific direction switching pattern depends on an application being executable by the electronic device.

6. The electronic device of claim 1, wherein if the direction switching pattern of the rotation member matches with the specific direction switching pattern, the controller is configured to perform a functional operation related to playback of a multimedia content.

7. The electronic device of claim 6, wherein the functional operation related to the playback of the multimedia content comprises at least one of playback and stop of the multimedia content, playback of a next multimedia content, playback of a previous multimedia content, setting of a shuffle playback mode, release of the shuffle playback mode, setting of a repeated playback mode, or release of the repeated playback mode.

8. The electronic device of claim 1, further comprising:
   a display configured to output a content,
   wherein if the direction switching pattern of the rotation member matches with the specific direction switching pattern, the controller is configured to perform a functional operation for changing an output magnification of the content.

9. The electronic device of claim 1, further comprising:
   a communication circuit configured to communicate with an external device by using a specific protocol,
   wherein, if the direction switching pattern of the rotation member matches with the specific direction switching pattern, the controller is configured to transmit a specific message to the external device through the communication circuit.

10. The electronic device of claim 9, wherein the external device that receives the specific message is designated in advance, and the specific message comprises at least one of a specific text or a specific image.

11. The electronic device of claim 9, wherein the external device that receives the specific message is connected to the electronic device through short range communication, and the specific message comprises an instruction on a functional operation of the external device.

12. The electronic device of claim 1, wherein:
   the number of switching rotational directions is more than twice, and
   switching rotational direction means either:
      rotating clockwise and switch rotating to counterclockwise; or
      rotating counterclockwise and switch rotating to clockwise.

13. An electronic device comprising:
   a housing;
   a circular display exposed to one surface of the housing;
   a wheel structure arranged on the one surface of the housing, surrounding the circular display, and being rotatable in a first direction and a second direction opposite to the first direction; a sensor configured to detect rotation of the wheel structure;
   a processor arranged within the housing and electrically connected to the circular display and the sensor; and
   a memory electrically connected to the processor,
   wherein the memory stores instructions, when executed, cause the processor to:
      display a first screen on the circular display;
      monitor rotation of the wheel structure by using the sensor;

receive a direction switching pattern of alternating at least one rotation in the first direction and at least one rotation in a second direction from the wheel structure;

determine, after the direction switching pattern is completed, whether the direction switching pattern of the wheel structure switching between the first direction and the second direction matches with a specific direction switching pattern stored in the memory, wherein the specific direction switching pattern is set based on a number of switching rotational directions between the first direction and the second direction for a specific time period based on the monitored rotation of the wheel structure; and modify at least a portion of the first screen to display the modified portion of the first screen on the circular display or perform a specific function of the electronic device corresponding to the specific direction switching pattern.

14. The electronic device of claim 13, wherein the instructions further cause the processor to:

monitor a rotational direction or a rotation distance of the wheel structure, by using the sensor.

15. The electronic device of claim 13, wherein the sensor comprises an optical sensor or a magnetic sensor.

16. The electronic device of claim 13, wherein the instructions further cause the processor to:

determine whether the wheel structure performs a first rotation in the first direction by at least a first rotation distance and performs a second rotation in the second direction by at least second rotation distance immediately after the first rotation for the specific time period.

17. The electronic device of claim 16, wherein the instructions further cause the processor to:

determine whether the wheel structure performs a third rotation in the first direction by at least a third rotation distance, immediately after the second rotation, and performs a fourth rotation in the second direction by at least a fourth rotation distance immediately after the third rotation for the specific time period.

18. The electronic device of claim 17, wherein the third rotation distance corresponds to the first rotation distance and the fourth rotation distance corresponds to the second rotation distance.

19. The electronic device of claim 17, wherein the instructions further cause the processor to:

when the processor determines that one of the first to fourth rotations or a combination of two or more thereof is performed, perform at least one corresponding function of a plurality of functions of the electronic device.

20. The electronic device of claim 13, further comprising:

a sound interface, wherein the instructions further cause the processor to modify a sound signal provided to the sound interface corresponding to the specific direction switching pattern.

* * * * *